US012067436B2

(12) United States Patent
Wahl et al.

(10) Patent No.: US 12,067,436 B2
(45) Date of Patent: Aug. 20, 2024

(54) RECONSTRUCTED SEGMENTED CODES AND METHODS OF USING THE SAME

(71) Applicant: RVC Technologies, Inc., Center Moriches, NY (US)

(72) Inventors: Jeffrey R. Wahl, Center Moriches, NY (US); Michael A. Lafauci, Center Moriches, NY (US); Jonathan Pinsky, Center Moriches, NY (US)

(73) Assignee: RVC Technologies, Inc., Center Moriches, NY (US)

( * ) Notice: Subject to any disclaimer, the term of this patent is extended or adjusted under 35 U.S.C. 154(b) by 10 days.

(21) Appl. No.: 17/407,601

(22) Filed: Aug. 20, 2021

(65) Prior Publication Data

US 2022/0215216 A1 Jul. 7, 2022

Related U.S. Application Data

(63) Continuation of application No. PCT/US2020/019122, filed on Feb. 20, 2020.
(Continued)

(51) Int. Cl.
*G06K 19/06* (2006.01)
*A61J 7/00* (2006.01)
(Continued)

(52) U.S. Cl.
CPC ...... *G06K 19/06046* (2013.01); *A61J 7/0076* (2013.01); *G06K 7/1417* (2013.01);
(Continued)

(58) Field of Classification Search
CPC .......... G06K 19/06037; G06K 7/1417; G06K 19/06046; G06K 19/06103;
(Continued)

(56) References Cited

U.S. PATENT DOCUMENTS 3,711,683 A 1/1973 Hamisch
5,230,429 A 7/1993 Etheredge, III
(Continued)

FOREIGN PATENT DOCUMENTS

DE 19807232 C1 7/1999
DE 102013011238 A1 1/2015
(Continued)

OTHER PUBLICATIONS

Tarng, "Development of a virtual butterfly ecological system based on augmented reality and mobile learning technologies" (Year: 2015).*

(Continued)

*Primary Examiner* — Thien T Mai
(74) *Attorney, Agent, or Firm* — Wilson Sonsini Goodrich & Rosati

(57) ABSTRACT

The present disclosure provides a reconstructable visual code. A visual code may be separated into a plurality of individual portions. The plurality of individual portions may be configured to transform between two or more states. In a first state, the plurality of individual portions may be spaced apart to form a non-functional visual code. In a second state, the plurality of individual portions may be moved relative to each other to form a functional visual code.

18 Claims, 22 Drawing Sheets

Related U.S. Application Data

(60) Provisional application No. 62/808,804, filed on Feb. 21, 2019.

(51) Int. Cl.
   *G06F 21/36* (2013.01)
   *G06K 7/14* (2006.01)

(52) U.S. Cl.
   CPC ..... *G06K 19/06037* (2013.01); *A61J 2205/30* (2013.01); *A61J 2205/50* (2013.01)

(58) Field of Classification Search
   CPC ......... G06K 19/06112; G06K 19/0614; G06K 19/06056; G06K 7/1434; G06K 7/1491; G06F 8/64; G06F 21/36; G06F 18/22; A61J 7/0076; A61J 2205/30; A61J 2205/50; A61J 2205/10; B42D 25/28; B42D 25/305; B41M 3/14
   See application file for complete search history.

(56) References Cited

U.S. PATENT DOCUMENTS

| | | | |
|---|---|---|---|
| 5,384,947 | A | 1/1995 | Kildal et al. |
| 5,852,590 | A | 12/1998 | De la Huerga |
| 6,259,654 | B1 | 7/2001 | De la Huerga |
| 8,251,290 | B1 | 8/2012 | Bushman et al. |
| 10,628,647 | B1 * | 4/2020 | Rossier ................... G06T 1/005 |
| 2005/0285377 | A1 | 12/2005 | Meyendorff et al. |
| 2007/0145140 | A1 * | 6/2007 | Yoshimura .......... B60R 21/2171 235/462.01 |
| 2011/0186623 | A1 * | 8/2011 | Truesdale ................. G07F 7/06 235/375 |
| 2012/0046635 | A1 | 2/2012 | Hedgepeth et al. |
| 2013/0031623 | A1 | 1/2013 | Sanders |
| 2013/0126601 | A1 | 5/2013 | Lee |
| 2013/0312373 | A1 | 11/2013 | Bogle et al. |
| 2014/0196136 | A1 | 7/2014 | Hill et al. |
| 2014/0284382 | A1 | 9/2014 | Park |
| 2015/0105745 | A1 | 4/2015 | Banik et al. |
| 2015/0224028 | A1 | 8/2015 | Carrel et al. |
| 2015/0367230 | A1 | 12/2015 | Bradford et al. |
| 2017/0046548 | A1 | 2/2017 | Kamijo et al. |
| 2017/0068785 | A1 | 3/2017 | Experton et al. |
| 2017/0189270 | A1 | 7/2017 | Nazzaro et al. |
| 2017/0287184 | A1 * | 10/2017 | Pettersson ............... G06F 18/22 |
| 2017/0351909 | A1 | 12/2017 | Kaehler |
| 2019/0262230 | A1 | 8/2019 | Bentkovski |
| 2022/0142862 | A1 | 5/2022 | Lafauci et al. |

FOREIGN PATENT DOCUMENTS

| | | |
|---|---|---|
| EP | 0275578 A1 | 7/1988 |
| EP | 2913086 A2 | 9/2015 |
| EP | 3410340 A1 * | 12/2018 |
| JP | 2009183390 A | 8/2009 |
| WO | WO-2020172471 A1 | 8/2020 |
| WO | WO-2020219724 A1 | 10/2020 |

OTHER PUBLICATIONS

EP20759289.0 Extended European Search Report dated Sep. 29, 2022.
PCT/US2020/019122 International Search Report and Written Opinion dated Jul. 16, 2020.
Ruth et al. Secure Multi-User Content Sharing for Augmented Reality Applications. Proceedings of the 28th USENIX Security Symposium, pp. 141-158, Santa Clara, CA, USA (Aug. 14-16, 2019). Available at URL: https://www.usenix.org/system/files/sec19-ruth.pdf.
EP20795518.8 Extended European Search Report dated Nov. 30, 2022.
International Search Report and Written Opinion for PCT Application No. PCT/US2020/029588 issued Jul. 14, 2020.
U.S. Appl. No. 17/509,691 Office Action dated May 15, 2024.

* cited by examiner

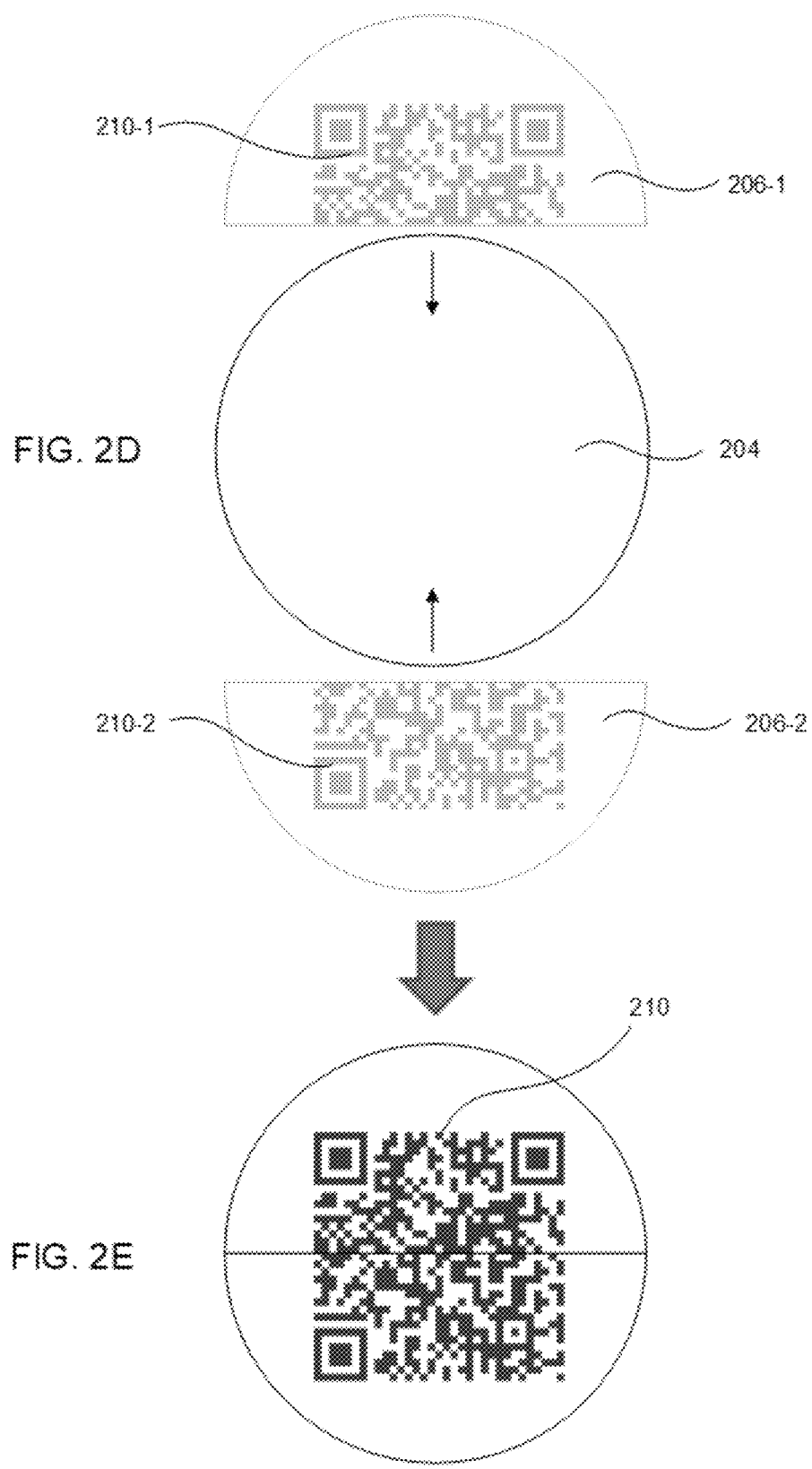

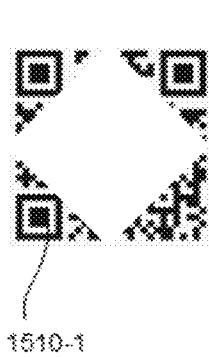
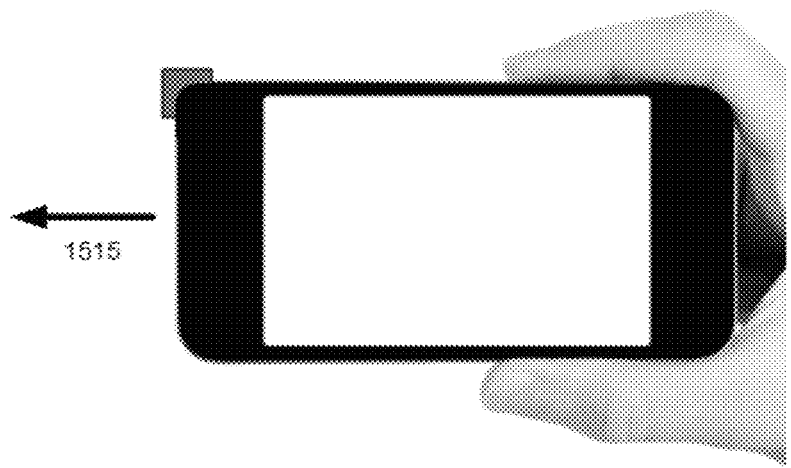
FIG. 15A
FIG. 15B
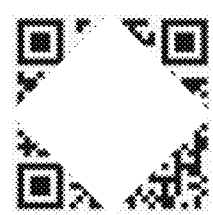
FIG. 15C

RECONSTRUCTED SEGMENTED CODES AND METHODS OF USING THE SAME

CROSS-REFERENCE

This application is a continuation of International Patent Application No. PCT/US20/19122, filed Feb. 20, 2020, which claims the benefit of U.S. Patent Application No. 62/808,804, filed Feb. 21, 2019, each of which is entirely incorporated herein by reference.

BACKGROUND

Visual codes (e.g., barcodes) are used in a variety of applications including, for example, tracking (e.g., monitoring and/or logging), accountability, security (e.g., a lock and key mechanism), authentication, and transfer of one or more articles (or devices). Examples of such article(s) include computer data comprising information, objects (e.g., documents, shipping packages, foods, drugs, etc.), animals (e.g., wild or domesticated animals), individuals (e.g., event attendees, patients, etc.), etc. The visual codes can comprise a graphical and/or textual element that encodes information about the article(s) or a link to such information that is stored in a separate database (e.g., a cloud database). The visual codes can be printed on the article(s) and read by a reader (e.g., an electronic reader) to identify the article(s) and permit transference or modification (e.g., update to provide a timestamp) of the encoded information.

The visual codes are typically static (e.g., not hidden), as they are printed or manufactured on the article(s) in a readable format. In some cases, such static visual codes may lack control of when the visual codes can be read and/or who can read the visual codes.

SUMMARY

The present disclosure describes systems and methods relating to a dynamic visual code. More specifically, the present disclosure describes systems and methods relating to a visual code that is divided into a plurality of portions that is readable by a reader. The plurality of portions of the visual code can be combined (e.g., upon activation) to form the visual code that is readable by the reader. The present disclosure describes software and hardware configurations for using such reconstructable visual codes. The present disclosure further describes methods of using the reconstructable visual codes, e.g., for security and user identification measures when picking up a prescription drug at a pharmacy.

An aspect of the present disclosure provides a reconstructable visual code, comprising a visual code that is separable (e.g., separated) into a plurality of individual portions configured to transform between two or more states, wherein, (i) in a first state, the plurality of individual portions are spaced apart to form a non-functional visual code, and (ii) in a second state, the plurality of individual portions are moved relative to each other to form a functional visual code.

In some embodiments, in the second state, the individual portions of the plurality of individual portions are (i) directly adjacent to each other, and/or (ii) overlapping over one another to form the functional visual code.

In some embodiments, each of the plurality of individual portions are disposed on one of a plurality of individual bases. In some embodiments, at least one of the plurality of individual bases are movable.

In some embodiments, the visual code is operatively coupled to a visual scanning system, configured to extract information from the functional visual code based, in part, on an image and/or a video of the functional visual code. In some embodiments, the visual scanning system is further configured to distinguish the visual code in the first state and the visual code in the second state.

In some embodiments, the reconstructable visual code can be used for tracking, accountability, security, authentication, and/or transaction of an article that carries the reconstructable visual code.

In some embodiments, the functional visual code is formed in an augmented reality environment. In some embodiments, in the first state, a first individual portion is in a physical environment, and a second individual portion is in the augmented reality environment. In some embodiments, the first and second individual portions are different. In some embodiments, in the second state, an image and/or video of the first individual portion and the second individual portion are moved relative to each other in the augmented reality environment to form the functional visual code.

In some embodiments, the plurality of individual portions comprises a first potion and a second portion, and (i) in the first state, the first portion and the second portion are separated to form the non-functional visual code, and (ii) in the second state, the first portion and the second portion are combined to form a functional visual code. In some embodiments, the first portion is provided by a pharmacy and the second portion is provided by a user of a drug or the user's proxy. In some embodiments, the first portion is provided (i) in an augmented reality environment associated with the pharmacy, or (ii) on a container or packaging configured to hold the drug that is assigned to the user. In some embodiments, the drug is prescribed to the user. In some embodiments, the second portion is provided (i) in an augmented reality environment associated with the user or the user's proxy, or (ii) on an identifier of the user or the user's proxy.

In some embodiments, a scanner is configured to scan one or both of the first portion and the second portion to form the functional visual code in an augmented reality environment associated with the scanner. In some embodiments, the scanner is part of a pharmacy device. In some embodiments, the scanner is part of a personal device of the user or the user's proxy. In some embodiments, the personal device comprises a mobile device.

In some embodiments, the first portion is provided with an object and the second portion is provided by a user device. In some embodiments, the first portion is provided (i) on the object, or (ii) on or inside a container or storage unit configured to hold the object. In some embodiments, the object is a merchandise, a shipping container configured to hold the merchandise, a shipping storage unit configured to hold the merchandise, a luggage, or an electronic display. In some embodiments, the first portion is provided on a tag coupled to the luggage. In some embodiments, the second portion is provided in an augmented reality environment associated with the user device.

In some embodiments, a scanner is configured to scan one or both of the first portion and the second portion to form the functional visual code in an augmented reality environment associated with the scanner. In some embodiments, the scanner is part of the user device, and the augmented reality environment is associated with the user device. In some embodiments, the personal device comprises a mobile device.

In some embodiments, the system further comprises a user device operatively coupled to the visual code. In some embodiments, the user device is configured to provide an augmented reality environment associated with at least a portion of the visual code. In some embodiments, the system comprises the scanner described elsewhere herein.

Another aspect of the present disclosure provides a method of reconstructing a visual code, comprising: (a) providing a visual code that is separable (e.g., separated) into a plurality of individual portions configured to transform between two or more states; and (b) transforming the plurality of individual portions from a first state to a second state, wherein, (i) in the first state, the plurality of individual portions are spaced apart to form a non-functional visual code, and (ii) in the second state, the plurality of individual portions are moved relative to each other to form a functional visual code.

In some embodiments, in the second state, the individual portions of the plurality of individual portions are (i) directly adjacent to each other, and/or (ii) overlapping over one another to form the functional visual code.

In some embodiments, each of the plurality of individual portions are disposed on one of a plurality of individual bases. In some embodiments, the transforming comprises moving at least one of the plurality of individual bases.

In some embodiments, the visual code is operatively coupled to a visual scanning system, configured to extract information from the functional visual code based, in part, on an image and/or a video of the functional visual code. In some embodiments, the visual scanning system is further configured to distinguish the visual code in the first state and the visual code in the second state.

In some embodiments, the reconstructable visual code can be used for tracking, accountability, security, authentication, and/or transaction of an article that carries the reconstructable visual code.

In some embodiments, the functional visual code is formed in an augmented reality environment. In some embodiments, in the first state, a first individual portion is in a physical environment, and a second individual portion is in the augmented reality environment. In some embodiments, the first and second individual portions are different. In some embodiments, in the second state, an image and/or video of the first individual portion and the second individual portion are moved relative to each other in the augmented reality environment to form the functional visual code.

In some embodiments, the plurality of individual portions comprises a first potion and a second portion, and (i) in the first state, the first portion and the second portion are separated to form the non-functional visual code, and (ii) in the second state, the first portion and the second portion are combined to form a functional visual code. In some embodiments, the method further comprises providing the first portion by a pharmacy and providing the second portion by a user of a drug or the user's proxy. In some embodiments, the method further comprises providing the first portion (i) in an augmented reality environment associated with the pharmacy, or (ii) on a container or packaging configured to hold the drug that is assigned to the user. In some embodiments, the drug is prescribed to the user. In some embodiments, the method further comprises providing the second portion (i) in an augmented reality environment associated with the user or the user's proxy, or (ii) on an identifier of the user or the user's proxy. In some embodiments, the method further comprises, by aid of a scanner, scanning one or both of the first portion and the second portion to form the functional visual code in an augmented reality environment associated with the scanner. In some embodiments, the scanner is part of a pharmacy device. In some embodiments, the scanner is part of a personal device of the user or the user's proxy. In some embodiments, the personal device comprises a mobile device.

In some embodiments, the method further comprises providing the first portion with an object and the second portion by a user device. In some embodiments, the first portion is provided (i) on the object, or (ii) on or inside a container or storage unit configured to hold the object. In some embodiments, the object is a merchandise, a shipping container configured to hold the merchandise, a shipping storage unit configured to hold the merchandise, a luggage, or an electronic display. In some embodiments, the first portion is provided on a tag coupled to the luggage.

In some embodiments, the method further comprises providing the second portion in an augmented reality environment associated with the user device. In some embodiments, the method further comprises, by aid of a scanner, scanning one or both of the first portion and the second portion to form the functional visual code in an augmented reality environment associated with the scanner. In some embodiments, the scanner is part of the user device, and the augmented reality environment is associated with the user device. In some embodiments, the personal device comprises a mobile device.

Another aspect of the disclosure provides a non-transitory computer readable medium comprising machine executable code that, upon execution by one or more computer processors, implements any one of the subject methods of the disclosure.

A different aspect of the present disclosure provides a computer system comprising one or more processors to execute the computer program product comprising a non-transitory computer-readable medium having computer-executable code encoded therein, the computer-executable code adapted to be executed to implement any one of the subject methods of the disclosure, e.g., a method comprising reconstructing a visual code.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 2D and 2E schematically illustrate another example of the device comprising a reconstructable matrix code with two segments.

FIGS. 15A-15H schematically illustrate hidden visual code systems that can be revealed by augmented reality.

DETAILED DESCRIPTION

Figure 1A:
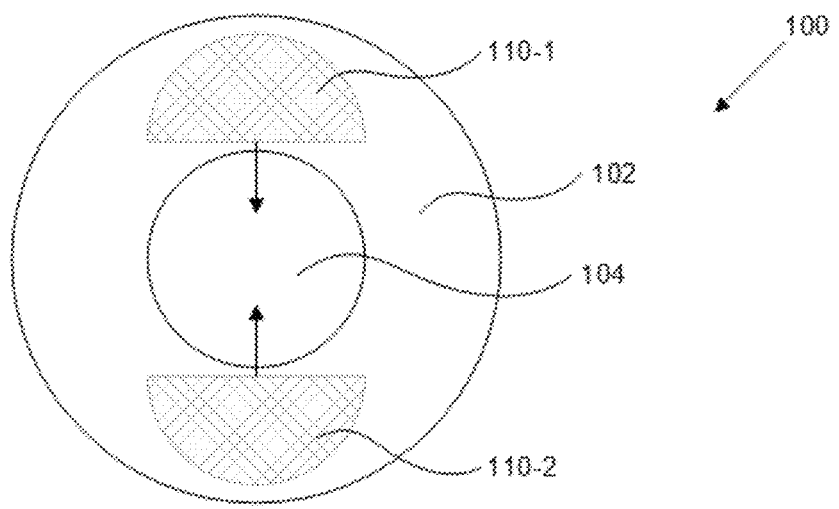
FIGS. 1A-1C schematically illustrate an example of a device comprising a reconstructable visual code with multiple segments.

The present disclosure describes systems and methods for a dynamic visual code operable in a variety of applications including, for example, tracking, accountability, security, authentication, and transfer of one or more articles. The systems and methods can provide mechanisms of reconstructing a plurality of portions of a visual code, such that the reconstructed visual may be readable by an electronic reader. The systems and methods can provide configurations of segmenting the visual code into the plurality of portions, as well as respective configurations of reconstructing the segmented visual code (e.g., upon an automatic and/or manual activation).

Systems and Methods for Reconstructable Visual Code

The term "visual code," as used herein, can refer to optical, machine-readable, representation (e.g., marking) of data, where the data usually describes something about the article(s) carrying the visual code. In some cases, the article(s) may comprise one or more devices. The visual code can comprise one or more graphical visual elements (e.g., one or more pictorial and/or textual datagrams), including, but are not limited to, one-dimensional (1D) visual codes representing the data by varying the width or spacing of parallel lines, two-dimensional (2D) visual codes which represents the data as a geometrical pattern, such as Quick Response (QR) codes, and/or three-dimensional (3D) visual codes. In some cases, the 3D visual codes may be a layer comprising a plurality of 1D and/or 2D visual codes, or a plurality of 1D and/or 2D visual codes that are at different depths with respective to one another. The visual code may or may not be visible by the naked eye.

In some cases, the visual code can be read by a visual scanning system (e.g., a sensor), such that the visual scanning system can extract information (e.g., information about the article(s) carrying the visual code) stored in the visual code. In some cases, the visual code can be read by the visual scanning system, such that the visual scanning system can be operatively connected to an external database that contains such information. In some cases, the visual code can be read by a user.

The visual code can comprise a linear (1D) visual code. The linear visual code can be static and/or dynamic (e.g., static and dynamic at different time points). The linear visual code can comprise one or more lines (e.g., one or more static lines) that create a unique linear pattern. The line(s) that create the unique linear pattern may be of a common color (i.e., monochromatic) or different colors (i.e., multichromatic). In an example, the linear visual code may be a black and white (B&W) pattern. In another example, the linear visual code may be a multichromatic colored pattern. In a different example, the linear pattern may be a multichromatic infrared pattern, wherein different portions of the linear pattern are configured to emit different temperatures that emit different infrared radiations that can be read by an infrared sensor. Alternatively or in addition to, the color of the line(s) may change over time (i.e., metachromatic). The line(s) of the linear visual code may be printed (or manufactured) on a surface of an article (e.g., an object) using a material, such as, for example, ink. Alternatively or in addition to, the surface of the article may be machined to create the line(s) of the linear visual codes on the surface of the article, such that the line(s) may project outwards or inwards of the surface of the article. The line(s) may lie in-plane or out-of-plane. The machined line(s) or the portion of the surface excluding the line(s) may be colored (with one or more colors). The line(s) may be parsed out by one or more spaces (e.g., one or more static spaces) to create the unique 1D linear pattern. The line(s) may be straight or not straight (e.g., curved, bent, angled, etc.).

The visual code may change continuously, periodically, according to a schedule, or in response to a detected event or condition.

A common linear visual code can comprise two or more sub-visual codes. The sub-visual codes may be on or adjacent to one another. The sub-visual codes may be overlapping with at least a portion of one another. In some cases, the sub-visual codes can comprise an "invisible" (e.g., invisible to the naked eye) visual code and a visible (e.g., visible to the naked eye) visual code. The invisible visual code may be embedded within the visible visual code. In some cases, the visible visual code may be used as a decoy, while the invisible visual code may comprise or be operatively linked to data comprising information of the article(s) carrying the linear visual code. In an example, the line(s) of the linear visual code may appear black to the naked eye, but may appear to exhibit multiple and distinguishable wavelengths of the electromagnetic spectrum (e.g., distinguishable using an infrared (IR) or ultraviolet (UV) visual scanning system).

In some cases, dynamically changing line(s), with or without static or dynamically changing space(s), can create a unique 1D linear pattern in real-time. The dynamically changing line(s) can create a plurality of 1D linear patterns (e.g., different 1D linear patterns) at a plurality of time points. In some examples, each of the plurality of different 1D linear patterns may be a unique, time-dependent 1D linear pattern that is readable by the visual scanning system. In some examples, only a portion of the plurality of different 1D linear patterns may be a unique time-dependent 1D linear pattern that is readable by the visual scanning system.

Examples of the linear visual code include Australia Post barcode, Codabar, Code 25 (interleaved or non-interleaved), Code 11, Code 32 (or Farmacode), Code 39, Code 49, Code 93, Code 128, Digital indeX (DX), European Article Numbers (EAN), Facing Identification Mark, Intelligent Mail barcode, Interleaved 2 of 5 (ITF), Modified Plessey, Pharmacode, Postal Alpha Numeric Encoding Technique (PLANET), PostBar, Postal Numeric Encoding Technique, Universal Product Code (e.g., UPC-A and UPC-E), a modification thereof, or a combination thereof.

One or more features or embodiments of the 1D visual code provided herein (e.g., static and/or dynamic visual codes; monochromatic, multichromatic, and/or metachromatic visual codes; sub-visual codes, etc.) may be utilized to generate any of the embodiments of visual codes (e.g., 2D and/or 3D visual codes) provided elsewhere in the present disclosure.

The visual code can comprise a matrix (2D) visual code. In some cases, the matrix visual code can contain more data (or information) per unit area of the visual code than the linear visual code. The matrix visual code can comprise a plurality of lines that are not parallel to each other. The matrix visual code may comprise at least 2, 3, 4, 5, 6, 7, 8, 9, 10, or more lines that are non-parallel. The matrix visual code may comprise at most 10, 9, 8, 7, 6, 5, 4, 3, or 2 lines that are non-parallel. An angle between two lines of the matrix visual code may be acute, perpendicular, or obtuse. At least a portion of the lines of the matrix visual code may or may not intersect at one or more points. The matrix visual code may comprise a plurality of areas. The plurality of areas may be of a same shape or different shapes, such as, for example, circular, triangular, square, rectangular, pentagonal, hexagonal, or any partial shape or combination of shapes thereof. The plurality of areas may be of a same color or different colors, such as, for example, indicative of different wavelengths of the electromagnetic radiation spectrum. At least a portion of the areas of the matrix visual code may or may not overlap with each other.

The matrix visual code can be a static and/or dynamic matrix visual code. The matrix visual code can be monochromatic, multichromatic (e.g., in the visible and/or infrared spectrum), and/or metachromatic matrix visual codes. The matrix visual code can comprise two or more sub-visual codes. The sub-visual codes of the matrix visual code may be matrix visual codes or a combination of a matrix visual code and a non-matrix visual code, such as, for example a linear visual code. In some cases, at least one of the sub-visual codes of the matrix visual code may be invisible (e.g., invisible to the naked eye).

Examples of the matrix visual code include Aztec, ColorCode, Color Construct Code, CrontoSign, CyberCode, d-touch, DataGlyphs, Data Matrix, Datastrip Code, Digimarc Barcode, DotCode, DWCode, EZcode, High Capacity Color Barcode, Han Xin Barcode, HueCode, InterCode, MaxiCode, Mobile Multi-Colored Composite (MMCC), NexCode, PDF417, Qode, QR code, ShotCode, Snapcode, SPARQCode, VOICEYE, a modification thereof, or a combination thereof. Other examples of the matrix visual code include one or more images and/or one or more texts.

The matrix visual code (e.g., the QR code) can have various symbol sizes as long as the matrix visual code can be scanned from a reasonable distance by the imaging device. The matrix visual code can be of any image format (e.g. EPS or SVG vector graphs, PNG, GIF, or JPEG raster graphics format).

The visual code can comprise a 3D visual code. In some cases, the 3D visual code can contain more data (or information) per unit area of the visual code than the linear visual code or the matrix visual code. The terms "2.5 dimension (2.5D)," and "3D," as used herein interchangeably, can refer to a visual code that provides a perception of depth. The 3D visual code can have a pattern that gives a perception of depth. The 3D visual code can have two or more portions that are disposed at different depths. In some cases, a first portion of the 3D visual code may be disposed at a position higher than a second portion of the 3D visual code (e.g., at higher position relative to a reference position in an article that carries the 3D visual code). In an example, the 3D visual code includes a holographic pattern. The holographic pattern may be an interference pattern that, when suitably illuminated, produces a 3D image.

The 3D visual code can be a static and/or dynamic 3D visual code. The 3D visual code can be monochromatic, multichromatic (e.g., in the visible and/or infrared spectrum), and/or metachromatic matrix visual codes. The 3D visual code can comprise two or more sub-visual codes. The sub-visual codes of the 3D visual code may be linear visual codes, matrix visual codes, 3D visual codes, or combinations thereof. In some cases, at least one of the sub-visual codes of the 3D visual code may be invisible (e.g., invisible to the naked eye). In some cases, a plurality of portions of the 3D visual code may be of different heights (and/or depths), whereby each group of one or more portions of a same height (and/or depth) can generate a unique sub-visual 3D code.

Examples of the 3D visual code include 3D variants of 1D and/or 2D visual codes, such as, for example, 3D variants of one or more barcodes, one or more images, one or more texts, or combinations thereof.

The visual code can be segmented into a plurality of potions. The visual code can be divided into at least 2, 3, 4, 5, 6, 7, 8, 9, 10, or more portions. The visual code can be divided into at most 10, 9, 8, 7, 6, 5, 4, 3, or 2 portions. The plurality of portions of the segmented visual code may be movable relative to each other, utilizing a mechanism similar to an aperture of a photographic camera. The terms "segmented," "divided," "separated," "furcated," "forked," "split," "portioned," and "sectioned," as used interchangeably herein, can refer to such segmentation of the visual code into the plurality of portions. The terms "portion", "leaf," "leaflet," "part," "piece," "base," "bit," "segment," "partition," "section," and "allocation," as used interchangeably herein, can refer to each portion of the plurality of portions of the segmented visual code. The plurality of portions of the visual code may have a same or different shape(s), size(s), depth(s), texture(s), color(s), temperature(s), motion (e.g., static or moving), magnetic field(s), electric field(s), composition(s) (e.g., metallic, ceramic, and/or polymeric materials that make up the visual code, such as ink, or a base layer that carries the visual code).

The visual code may be substantially flat, raised, indented, or have any texture.

The segmented visual code can be reconstructed to form a unified visual code that is readable by the visual scanning system. The terms "reconstructed," "combined," "generated," "re-generated," "created," "re-created," "completed," and "united," as used interchangeable herein, can refer to such unified visual code from the segmented visual code. The segmented (and non-reconstructed) visual code may not be readable by the visual scanning system. The reconstruction of the segmented visual code (e.g., combination of the plurality of portions of the visual code) may be reversible (i.e., non-permanent) or irreversible (i.e., permanent). The irreversible reconstruction of the segmented visual code may comprise utilizing a locking (e.g., automatic or manual) mechanism.

Alternatively or in addition to, both the segmented and reconstructed visual code may be readable by the visual scanning system. In such a case, the segmented visual code may encode a first visual code, the reconstructed visual code may encode a second visual code, and the first and second visual codes may be different such that the visual scanning system can distinguish the segmented visual code and the reconstructed visual code from each other.

In another alternative, or addition, the first visual code of the segmented visual code may be readable by a first visual scanning system, the second visual code of the reconstructed visual code may be readable by a second visual scanning system, wherein the first and second visual scanning systems are different such that the first and second visual codes may be distinguishable.

The visual code may be added (e.g., printed, machined, glued, etc.) on an article. The plurality of portions of the segmented visual code may be on a common base layer or a plurality of base layers (e.g., at least 2, 3, 4, 5, 6, 7, 8, 9, 10 or more base layers, or at most 10, 9, 8, 7, 6, 5, 4, 3, or 2 base layers). The common base layer comprising the plurality of portions of the visual code can undergo a shape shift (e.g., folding), thereby resulting in reconstruction of the visual code. Alternatively or in addition to, the plurality of base layers may be brought together (e.g., by a mechanical force), thereby resulting in reconstruction of the visual code. When brought together, the plurality of base layers may or may not overlap with each other. In some cases, the plurality of base layers may be brought together side-by-side without an overlap. When side-by-side, the base layers may or may not be in contact with each other. When side-by-side, the base layers may or may not be separated by a gap. In some cases, the plurality of base layers may be brought together while at least a portion of a first base layer overlaps with at least a portion of a second base. In such a case, one or both of the first and second base layers may comprise a portion of the plurality of portions of the visual code. In an example, the visual code may be a hidden visual code, wherein the segmented portions of the visual code may be brought together and overlapped to reveal a hidden, unique visual code. The hidden, unique visual code can then be read by the visual scanning device(s). Reconstruction of the segmented visual code may comprise overlapping at least a portion of at least 2, 3, 4, 5, 6, 7, 8, 9, 10, or more portions of the segmented visual code. Reconstruction of the segmented visual code may comprise overlapping at least a portion of at most 10, 9, 8, 7, 6, 5, 4, 3, or 2 portions of the segmented visual code.

In some cases, at least a portion of the reconstructable visual can be hidden initially, and the hidden visual code can be revealed using one or more revealing mechanisms. The revealing mechanism may be manual (e.g., manually triggered by the user) and/or automatic (e.g., upon a predetermined time or detection of a factor, such as humidity, temperature, pressure, etc.). In some cases, the hidden visual code can be revealed by an authenticated user in possession of the revealing mechanism(s) or a tool for inducing the revealing mechanism(s). In some cases, the entire visual code can be hidden and later be revealed to reconstruct the visual code into a functional visual code. In some cases, a portion of the visual code can be hidden, and later be revealed and subsequently combined with a perpetually visible portion of the visual code to reconstruct the visual code into a functional visual code.

In some cases, the revealing of the hidden visual code can comprise appearance of the visual code, a change in one or more colors of the visual code, and/or a morphological change in the visual code.

Examples of the revealing mechanism(s) for the hidden visual code can include augmented reality (AR), virtual reality (VR), electromagnetic radiation (e.g., visible, infrared, ultraviolet light, radio frequency, etc.) from sunlight or one or more alternative light sources (e.g., light bulbs, flashlights, strobe, etc.), magnetic field (e.g., magnets), electricity, temperature, pH, oxygen level or density, other chemicals (e.g., by a chemical sensor communicatively coupled to the reconstructable visual code), touch and/or pressure, vibration (e.g., vibrational frequency), audio, wind, motion (e.g., detected by a gyroscope and/or an accelerometer communicatively coupled to the reconstructable visual code), or geolocation (e.g., detected by a global positioning system (GPS) communicatively coupled to the reconstructable visual code).

The terms "augmented reality" and "AR," as used herein, can refer to a view of a physical, real-world object and/or environment that is augmented or supplemented by computer-generated or digital information such as video, sound, and/or graphics. The digital information can be directly registered in the user's physical, real-world environment such that the user may interact with the digital information in real time. The digital information may take the form of images, sound, haptic feedback, video, text, etc. For example, 2D or 3D representations of digital objects may be overlaid over the user's view of the real-world environment in real time.

The terms "virtual reality" and "VR," as used herein, can refer to a simulation of a user's presence in an environment, real or imagined, such that the user may interact with it.

In some cases, the revealing mechanism(s) for the hidden visual code can be an augmented reality. In such a case, a first portion of the visual code (e.g., a bar code, QR code, etc.) can be a physical visual code, and a second portion of the visual code can be a virtual visual code. The physical visual code may be in a physical environment or space. The first portion and the second portion of the visual code may be combined in an augmented reality space to generate a functional visual code. The physical visual code may be disposed on or adjacent to a physical object. The virtual visual code may be displayed on a graphical user interface (GUI) of a device (e.g., an authorized scanner, tablet, or mobile device) of the user. The GUI may be displayed on a screen (e.g., black and white, or color screen) of the device.

In some cases, the device may scan the user's fingerprint or retina and confirm the user's identity, thereby to activate the GUI of the device and/or authorize the user to use the GUI to reveal the hidden visual code. Additionally, the device may comprise a sensor (e.g., a camera disposed on an opposite side of the screen displaying the GUI), and the GUI may be operatively coupled to the camera. Upon activation of the GUI and/or authorization of the user, the user may use the sensor (e.g., camera) of the device to (1) capture an image and/or video of the physical visual code, and display the captured image and/or video on the GUI of the device, and/or (2) view the physical visual code in real time through the GUI of the device. Subsequently, the augmented reality software in operative communication with the GUI may reveal the virtual visual code on the GUI, and reconstruct/combine the physical visual code and the virtual visual code into a functional visual code. The augmented reality software may further be configured to read the reconstructed, functional visual code within the GUI. Alternatively or in addition to, the user may use a different device (e.g., a visual code scanner) to read the reconstructed, functional visual code.'

In some cases, the revealing mechanism(s) for the hidden visual code can be temperature. The hidden visual code can be revealed upon detecting a change in the temperature (e.g., an increase and/or decrease in the ambient temperature). The hidden visual code can be revealed upon reaching a predetermined temperature (e.g., higher or lower than a threshold temperature of the ambient temperature). In some cases, a change in the temperature may be induced by the user, for example, by directing a hot and/or cool air fan towards the hidden code. The temperature or a change in the temperature may be measured by a sensor (e.g., a temperature sensor or a piezo sensor) that is communicatively coupled to the reconstructable visual code. Alternatively or in addition to, a material of the hidden visual code (e.g., a temperature responsive polymer, etc.) may be able to detect the temperature or the change in the temperature.

Examples of the temperature responsive polymer may include, but are not limited to, poly(N-isopropylacrylamide) (poly(NIPAM)); co-polymers of poly(NIPAM) with one or more additional polymers, such as polyacrylic acid, poly (dimethylaminopropylacryl-amide), or poly(diallyldimethylammonium chloride) (DADMAC); polyethylene oxide; poly propylene oxide; methylcellulose; ethyl hydroxyethyl cellulose; carboxymethyl cellulose; hydrophobically modified ethyl hydroxyethl cellulose; poly dimethylacrylamide/N-4-phenylazophenylacrylamide (DMAAm) and poly dimethylacrylamide/4-phenylazophenylacryate (DMAA), gelatine, agarose, amylase, agar, pectin, carragenan, xanthan gum, guar gum, locust bean gum, hyaluronate, dextran, starches, alginic acid, functional variants thereof, or combinations thereof.

In some cases, the revealing mechanism(s) for the hidden visual code can be pH (e.g., environmental pH or pH of another object functionally coupled to the visual code). The pH or a change in the pH may be measured by a pH sensor that is communicatively coupled to the reconstructable visual code. Alternatively or in addition to, a material of the hidden visual code (e.g., a pH responsive polymer, etc.) may be able to detect the pH or the change in the pH.

Examples of the pH sensitive polymer may include, but are not limited to, poly(L-histidine-co-phenylalanine)-poly (ethylene glycol) block copolymer, poly(L-lactic acid)-poly (ethylene glycol) block copolymer, poly(acrylic acid) polymers, poly(ethyl acrylic acid), poly(propylacrylic acid), poly (butyl acrylic acid), a functional variant thereof, or a combination thereof. Other pH sensitive polymers may include polyelectrolytes that have a large number of ionizable groups, such as poly(sulfonic acid) polymers and their derivatives, hyaluronic acid, poly(vinylamine), poly(N-isopropylacrylamide), functional variants thereof, or combinations thereof.

In some cases, the revealing mechanism(s) for the hidden visual code can be electricity. The electricity may be directed (e.g., from a battery operatively coupled to the reconstructable visual code) to the hidden visual code to reveal the visual code and reconstruct the visual code. In some cases, the hidden visual code may be comprised of electricity sensitive (i.e., electrosensitive, electroresponsive, electroadaptive, etc.) materials. The electricity sensitive materials may comprise piezoelectric materials. The piezoelectric materials may exhibit converse piezoelectric effect, wherein application of an electrical field or electricity creates a morphological change (e.g., mechanical deformation) in the piezoelectric material, thereby transforming the hidden visual code into a revealed visual code.

The piezoelectric materials may comprise piezoelectric polymers. Examples of the piezoelectric polymers may include polyvinylidene fluoride, copolymer of vinylidene fluoride and trifluoroethylene, copolymer of vinylidene fluoride and trifluoroethylene, vinylidene cyanide-vinyl acetate copolymer, polylactic acid, functional variants thereof, or combinations thereof.

The segmented visual codes can be reconstructed to create a 1D, 2D, or 3D visual code.

The segmented visual code can be reconstructed to create one or more images (e.g., a same image or different images) of one or more objects (e.g., a same object or different objects). The image(s) may comprise a photographic image and/or a stereoscopic image. The photographic image may be an image that does not provide a perception of depth (e.g., a 1D and/or 2D image). The stereoscopic image (i.e., a stereo-pair image) may comprise at least two images that provide a perception of depth (e.g., a "left eye" image intended for a left eye of an observer and a "right eye" image intended for a right eye of the observer). Observance of the stereoscopic image by both the left and right eyes of the observer may be required to process the left eye and right eye images into a unique visual code. In an example, the left eye and right eye images may be different leaflets of the segmented visual code, and reconstruction by overlapping at least a portion of each of the left eye and the eye may provide the readable stereoscopic image. The image(s) of the visual code may be symbols (e.g., mathematical symbols).

The segmented visual code may comprise one or more text codes. The text code(s) may comprise numbers or alphabets. Alphabets may comprise one or more letters from Afrikaans, Albanian, Amharic, Arabic, Armenian, Assamese, Assyrian, Avar, Azerbaijani, Balinese, Bamara Bantu, Bashkir, Basque, Bengali Birhari, Bulgarian, Buluba-Lulua, Burmese, Buryat, Byelorussian, Caddoan, Cantonese, Catalan, Chechen, Chikaranga, Chippewa, Choctaw, Church Slavik, Chuvash, Coptic, Cree, Croatian, Cyrillic, Czech, Dakota, Danish, Dari, Devanagari, Dutch, Dzongkha, English, Eskimo, Esperanto, Estonian, Ewe, Farsi, Fijian, Filipino, Finnish, Flemish, French, Fulani, Gaelic, Galician, Georgian, German, Greek, Gujarati, Gurmakhi, Harari, Hausa, Hawaiian, Hebrew, Hindi, Hiragana, Ibo, Icelandic, Indonesian, Irish, Irogquoian, Italian, Japanese, Kabardian, Kalmyk, Kannada, Kanuri, Kashmiri, Katakana, Kazakh, Khasi, Khmer, Kirghiz, Kishmiri, Komi, Kongo, Korean, Kurdish, Lao, Latin, Latvian, Lithuanian, Lu-Guanda, Macedonian, Magahi Maithili, Makua, Malagasy, Malay, Malayalam, Maltese, Mandarin, Mandingo, Manipuri, Marathi, Masai, Mizo, Moldavian, Mongolian, Munda, Naga, Navaho, Nyanja, Nepalese, Norwegian, Oriya, Oromo, Ossetian, Pashto, Polish, Portugese, Punjabi, Rajasthani, Rhaeto-Romanic, Rumanian, Russian, Samoan, Sangs, Serbian, SerboCroatian, Sinhalese, Sinhi, Sioux, Slovak, Slovenia, Spanish, Sundanese, Swahili, Swedish, Syriac, Tadzhik, Tagalog, Tajik, Tamil, Tatar, Telugu, Thai, Tibetan, Turkish, Turknen, Udmurt, Uighur, Ukranian, Umbundu, Urdu, Uzbek, Vietnamese, Visayan, Welsh, Yakut, Yoruba, or a combination thereof.

In some cases, the text code(s) may comprise a "Completely Automated Public Turing test to tell Computers and Humans Apart (CAPTCHA)" code (e.g., reCAPTCHA) that may not be readable by the visual scanning device(s). When not readable by the visual scanning device(s), such reconstructed visual code comprising the CAPTCHA code may be read (or scanned) by a user and recorded (e.g., on a computer) by the user. In some cases, the text code(s) may comprise texts that are not CAPTCHA and may be readable by the visual scanning device(s).

As provided elsewhere in the present disclosure, the image(s) and/or text(s) of the segmented visual code may be monochromatic, multichromatic (e.g., in the visible and/or infrared spectrum), and/or metachromatic. As provided elsewhere in the present disclosure, the image(s) and/or text(s) of the segmented visual code may be static (e.g., one or more images) or dynamic (e.g., one or more videos). In some cases, movement and/or readjustment of two or more leaflets of the segmented visual code can generate two or more unique unified visual codes that can be read and distinguished by the visual scanning device(s).

The reconstructed visual code can emit vibrations or sounds that may be picked up by a microphone or any type of acoustic sensor. Such vibrations or sounds of the reconstructed visual code may be different than vibrations or sounds of the segmented visual code. In some cases, the reconstructed visual code may emit vibrations or sounds for a pre-determined period of time (e.g., at least 1, 2, 3, 4, 5, 6, 7, 8, 9, 10, 20, 30, 60, or more minutes, or at most 60, 30, 20, 10, 9, 8, 7, 6, 5, 4, 3, 2, 1, or less minutes) upon reconstruction. Such time-controlled vibrations or sounds may be a notification to a user (e.g., a nurse at a hospital) to read the reconstructed visual code within the pre-determined period of time. Such time-controlled vibrations or sounds may stop after the pre-determined period of time. In some cases, the segmented visual code may each emit vibrations or sounds, and reconstruction of such segmented visual code may generate a new vibration or sound that is unique to the reconstructed visual code. The reconstructed visual code may be characterized by its emitted frequencies, pitches, harmonics, ranges, or patterns of sounds that may be detected. The vibrations and/or sounds of the reconstructed visual code may or may not be discernible by the human ear and/or touch. In some cases, visual codes may emit wireless signals, such as radiofrequency signals, Bluetooth signals, Wifi signals or any other type of signals.

The reconstructable visual code can be operatively coupled to one or more actuation elements. In some cases, the reconstructable visual code can be added (e.g., printed, machined, glued, etc.) to one or more moving pieces of an article that carries (or is marked by) the visual code. The moving piece(s) (e.g., leaflet(s)) may be operatively coupled to the actuation element(s). The actuation element(s) may adjust (e.g., increase, maintain, and/or decrease) one or more gaps between (or among) segments of the reconstructable visual code, thereby to reconstruct and/or deconstruct the reconstructable visual code.

At least one of the moving pieces carrying a segment of the reconstructable visual code may be movable. In some cases, (i) a first leaflet of the article carrying a first segment of the reconstructable visual code and/or (ii) a second leaflet of the article carrying a second segment of the reconstructable visual code may be movable relative to each other to be reconstructed (overlapping or not) to create at least a portion of the reconstructed visual code. As the movement is a relative movement, the moving piece may be the first leaflet, the second leaflet, or both. Such configuration may be applicable to other reconstructable visual codes provided in the present disclosure.

The actuation element(s) can comprise one or more spring elements for actuating and/or closing a gap between segments of the reconstructable visual code. Non-limiting examples of the spring element(s) can include a variety of suitable spring types, e.g., nested compression springs, buckling columns, conical springs, variable-pitch springs, snap-rings, double torsion springs, wire forms, limited-travel extension springs, braided-wire springs, etc. Alternatively or in addition to, the actuation element(s) (e.g., spring elements) can be made from any of a number of metals, plastics, or composite materials. In some cases, the spring element(s) can comprise deployment springs and/or retraction spring(s) to direct the relative movement of the segments of the reconstructable visual code.

The actuation element(s) can comprise a mechanical and/or electromechanical element capable of motion in one or more axes of control (e.g., one or more of the XYZ planes) via one or more actuators. Non-limiting examples of the actuation element(s) can include magnets, electromagnets, pneumatic actuators, hydraulic actuators, motors (e.g. brushless motors, direct current (DC) brush motors, rotational motors, servo motors, direct-drive rotational motors, DC torque motors, linear solenoids stepper motors, and shaft actuators (e.g. hollow shaft actuators), ultrasonic motors, geared motors, speed-reduced motors, or piggybacked motor combinations), gears, cams, linear drives, belts, pulleys, conveyors, and the like. Another non-limiting example of the actuation element(s) include heating and/or cooling elements (e.g., wires) that emit radiation (e.g., IR radiation) that can be read by a sensor (e.g., an IR sensor). In such a case, the heating and/or cooling elements may be operatively coupled to a temperature controller that regulates a temperature of the heating and/or cooling element, thereby to control the reconstructable visual code.

The actuator(s) of the moving pieces carrying the segments of the reconstructable visual code may be operatively connected to a controller (e.g., a computer). The controller may direct movement of the moving pieces relative to each other to create at least a portion of the reconstructed visual code.

The actuation mechanism of the actuation element(s) may be reversible or irreversible. Alternatively or in addition to, the reconstructed visual code may be irreversible (i.e., non-retractable) by activating a locking mechanism that prevents one or more segments of the reconstructable visual code from moving again once the reconstructed visual code has been created (e.g., once an aperture carrying the reconstructable visual code has been closed).

Reconstruction of the reconstructable visual code can be triggered by an activation element. Operations of the actuation element(s) that induce the reconstruction of the reconstructable visual code can be triggered by the activation element. The activation element may be automatic and/or manual. In some cases, an article carrying a reconstructable visual code can comprise a mechanical switch (e.g., a button) operatively coupled to the actuation element(s), and a user of the article may be required to manipulate (e.g., push, pull, press, rotate, etc.) the switch to initiate the activation element. Alternatively or in addition to, the article carrying the reconstructable visual code can comprise a time-dependent switch (e.g., a timer) operatively coupled to the actuation element(s), and the time-dependent switch may initiate the activation element at a pre-determined time without any user input. In some cases, the activation element may comprise both automatic and manual elements. In an example, the switch to activate the actuation element(s) may only be functional during a pre-determined time period, and thus the reconstructable visual code may be reconstructed during the pre-determined time period.

The lifetime of the reconstructed visual code may be permanent or transient. In some cases, the reconstructable visual code may be operatively coupled to a hiding mechanism that is configured to hide (e.g., shield, cover, make disappear, etc.) the reconstructed visual code automatically (e.g., at a pre-determined time) and/or manually (e.g., by the user input).

Any of the visual code may be reconstructable by using any of the features or embodiments provided in the present disclosure.

The terms "reader," "sensor," or "scanner," as used interchangeably herein, can refer to the visual scanning system configured to read the visual code (e.g., the reconstructable or reconstructed digital code). The visual scanning system can be configured to can the visual code from a reasonable distance from the visual code. A user may take an image or video of a reconstructed visual code using a visual scanning system, and the visual scanning system may be configured to transmit the image or video to an optical character recognition (OCR) engine for processing to extract relevant information from the image or video data. The visual scanning system may comprise one or more visual scanning devices (e.g., at least 1, 2, 3, 4, 5, or more visual scanning devices, or at most 5, 4, 3, 2, or 1 visual scanning device) configured to read the visual code. The visual scanning system may be configured to read the visual code in its segmented, non-reconstructed form and/or in its unified, reconstructed form. The visual scanning system can be used to read a one-dimensional (1D) visual code (e.g., a barcode), two-dimensional (2D) visual code (e.g., a QR code), and/or three-dimensional (3D) visual code (e.g., a pattern with a perception of depth). Examples of the visual scanning device(s) include a detector, vision system, computer vision, machine vision, imager, camera, binocular camera, digital camera, electromagnetic radiation sensor (e.g., IR sensor, UV sensor, color sensor, etc.), proximity sensor, densitometer (e.g., optical densitometer), profilometer, spectrometer, pyrometer, motion sensor, magnetic field sensor (e.g., microelectromechanical systems), electric field sensor, etc.

The visual scanning system may be implemented as a stand-alone system, and need not be provided on another device, such as, for example, a user device (e.g., a tablet computer, a mobile phone, a smart phone, a smart watch, a smart glass, etc.). In some cases, the stand-alone visual scanning system can be a customized visual scanning system that is specifically designed for scanning reconstructed visual codes. The customized visual scanning system may be sold to end users of the reconstructed visual codes and/or licensed to one or more original equipment manufacturers (OEM). Alternatively or in addition to, the customized visual scanning system can be an add-on (e.g., hardware and/or software add-on) to the user device. The reconstructed visual code may not be read, captured, and/or processed without such add-on. In some cases, a hardware add-on may be operatively coupled to the user device via a wireless signal (e.g., Bluetooth, Wifi, etc.) or a cable connection (e.g., USB 2.0, USC-C, micro-USB, etc.). In some cases, the hardware add-on may be an optical device (e.g., a lens) that is coupled on or adjacent to one or more cameras on the user device. In some cases, a software add-on may be provided (e.g., downloaded) and operatively coupled to the user device (e.g., to one or more cameras of the user device). In another alternative, or addition, the visual scanning system may be provided on the user device (e.g., the user device may have a camera operable as the visual scanning system). In some cases, the visual scanning system can utilize one or more cameras on the user device. The visual scanning system may be implemented using off-the-shelf camera(s) on the user device with or without requiring any modification of the camera(s).

In some cases, a user may register with a control entity by providing the visual code to the control entity. The user may input the visual code into the visual scanning system application, user device application, and/or web-based application that is configured to transmit the code to the control entity. The user may input the visual code, for example, by capturing or scanning an image of the visual code using a built-in sensor (e.g., a build-in camera) on the visual scanning system or user device. The visual scanning system application, user device application, and/or web-based application may decipher the visual code and transmit the code to a server (e.g., that is operated by a control entity). In some cases, the visual scanning system application, user device application, and/or web-based application may transmit the visual code in raw format to the server for decoding/deciphering.

The visual scanning device(s) as provided herein can serve as an image capture and/or scanning device. The visual scanning device(s) may be a physical imaging device. The visual scanning device(s) can be configured to detect electromagnetic radiation (e.g., visible, infrared, and/or ultraviolet light) and generate image data based on the detected electromagnetic radiation. The visual scanning device(s) may include a charge-coupled device (CCD) sensor or a complementary metal-oxide-semiconductor (CMOS) sensor that generates electrical signals in response to wavelengths of light. The resultant electrical signals can be processed to produce image data. The image data generated by the visual scanning device(s) can include one or more images, which may be static images (e.g., visual codes, photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto one or more image sensors of the visual scanning devices(s).

The visual scanning device(s) can be a camera. The camera can be a movie or video camera that captures dynamic image data (e.g., video). The camera can be a still camera that captures static images (e.g., photographs). Examples of the static images may include letters, numbers, icons, shapes, symbols, pictures, 1D, 2D, or 3D bar codes, quick response (QR) codes, or any other type of image. The camera may capture both dynamic image data and static images. The camera may switch between capturing dynamic image data and static images. Although certain embodiments provided herein are provided in the context of cameras, it shall be understood that the present disclosure can be applied to any suitable visual scanning device(s), and any description herein relating to cameras can also be applied to any suitable visual scanning device(s), and any description herein relating to cameras can also be applied to other types of visual scanning device(s). The camera can be used to generate 2D images of a 3D code. The images generated by the camera can represent the projection of the 3D code onto a 2D image plane. Accordingly, each point in the 2D image may correspond to a 3D spatial coordinate in the 3D code. The camera may comprise optical elements (e.g., lens, mirrors, filters, etc). The camera may capture color images, greyscale image, infrared images, and the like. The camera may be a thermal visual scanning device(s) when it is configured to capture infrared images.

The visual scanning device(s) can capture an image or a sequence of images at a specific image resolution. In some cases, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some cases, the visual scanning device(s) may be a 4K camera or a camera with a lower or higher resolution.

The visual scanning device(s) may capture a sequence of images at a specific capture rate. In some cases, the sequence of images may be captured standard video frame rates such as about 24 progressive ("p," or full images per second), 25p, 30p, 48p, 50p, 60p, 72p, 90p, 100p, 120p, 300p, 50 interlaced ("i," or fields per second), or 60i. In some cases, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some cases, the capture rate may change depending on user input and/or the target application.

In some cases, the visual scanning device(s) may be a high speed camera. The high speed camera can have a high sampling frequency. In some cases, the high speed camera of the visual scanning system(s) may be capable of capturing a reconstructed visual code that refreshes or changes at a frequency above the maximal frame rate perceivable by the naked eye.

The visual scanning device(s) may have adjustable parameters. Under differing parameters, different images and/or videos may be captured by the visual scanning device(s) while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches the image sensor(s) in the visual scanning device(s). For example, shutter speed may control the amount of time light reaches the image sensor(s) and aperture may control the amount of light that reaches the image sensor(s) in a given time. Parameters related to gain may control the amplification of a signal from the optical sensor. In some cases, ISO may control the level of sensitivity of the camera to available light.

In some cases, the visual scanning device(s) may extend beyond a physical scanning device. For example, the visual scanning device(s) may include any technique that is capable of capturing and/or generating images or video frames of codes. In some cases, the visual scanning device(s) may refer to an algorithm that is capable of processing images obtained from another physical device.

The visual scanning system(s) can be capable of detecting multiple layers within a visual image (e.g., within a reconstructed visual image). In some cases, the reconstructed visual image may comprise an overlap of two or more layers of the segmented visual image, and the visual scanning system(s) may be capable of discerning, distinguishing, or discretizing the overlapped layers. In an example, the reconstructed visual image may comprise an overlap of three layers of the segmented visual image, and the real visual code may be a combination of two of the three layers. In such a case, the visual scanning system(s) may be capable of discretizing the real visual code after scanning the reconstructed visual image of the overlap of three layers.

The visual scanning system(s) may be operatively coupled to a controller (e.g., a computer) capable of employing artificial intelligence (e.g., one or more machine learning algorithms) to analyze a database comprising a plurality of images and/or videos of (i) the visual codes prior to segmentation of each visual code, (ii) the visual codes in their segmented, non-reconstructed form, and/or (iii) the visual codes in their unified, reconstructed form. One or more machine learning algorithms of the artificial intelligence may be capable of analyzing a captured image or video of the reconstructed visual code. One or more machine learning algorithms of the artificial intelligence may be capable of distinguishing or differentiating reconstructed visual codes from their respective, non-reconstructed visual codes. One or more machine learning algorithms of the artificial intelligence may be capable of further reconstructing the images and/or videos of the visual codes in their unified, reconstructed form in case when the physical reconstruction of the visual codes were incomplete.

In some cases, a unique pattern of a reconstructable visual code may have a tolerance. The reconstructable visual code may have a pre-determined range of alignment threshold. Thus, subsequent to reconstruction of the visual code, varying alignment configurations of a plurality of segments of the reconstructable visual code may be acceptable and detectable by the visual scanning system(s), as long as the varying alignment configurations are within the pre-determined range of alignment threshold. Such pre-determined alignment threshold may be defined by a distance between two or more segments of the visual code, a total area of the reconstructed visual code, a degree of overlap between two or more segments of the visual code, etc.

The reconstructable visual codes provided herein can be used in a variety of applications including, for example, identification, tracking (e.g., monitoring and/or logging), accountability, security (e.g., a lock and key mechanism), authentication, transaction, and/or transfer of one or more articles. Examples of such article(s) include computer data comprising information, objects (e.g., documents, shipping packages, foods, drugs, etc.), animals (e.g., wild or domesticated animals), individuals (e.g., event attendees, patients at a hospital, etc.), etc. In some cases, two or more articles (e.g., two or more articles of luggage) may each comprise at least one segment of a segmented visual code, and the respective reconstructed visual code may be scanned to confirm a correct paring of the two or more articles. Industries, such as, for example, healthcare (e.g., patient care, pharmaceutical distribution and/or administration, etc.), logistics (e.g., operation involving people, supplies, and/or facilities), supply chain, shipping, disposal (e.g., disposal of controlled pharmaceuticals or toxic wastes), retail, banking, finance, or a combination thereof may benefit from a use of the reconstructable visual codes.

In healthcare, for example, the reconstructable visual codes can be used to track two or more patients. In an example, two or more patients can each have a tag, wherein each tag carries at least a portion of the segmented visual code. The tags from the two or more patient(s) can be brought together, with or without any overlap, and the visual scanning system(s) can be used to track the group of two or more patients. In an example, the group of two or more patients may be a post-partum mother and a newborn baby, or a bone marrow recipient and a donor.

The types of transactions that can be authenticated, for example, include medication pick-up or drop off (e.g., at a pharmacy by a user of the medication or the user's proxy), web based financial transactions, point of sale financial transactions, security transactions, or identification transactions. A device configured to display a visual code (e.g., a QR code) to a user. The device can be a computer (e.g., laptop computer, desktop computer), a mobile device (e.g., smartphone, tablet, pager, personal digital assistant (PDA)), a vending machine, or the like requiring authentication or verification of the user to conduct a session or transaction utilizing the display device to complete the transaction running on a server (i.e., a service provider).

Figure 1B:
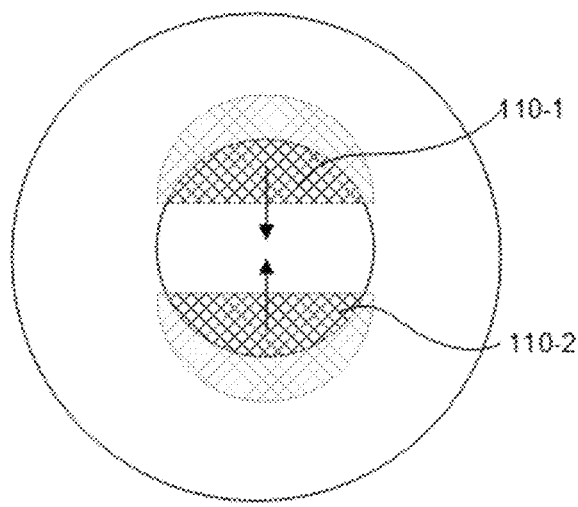
Figure 1C:
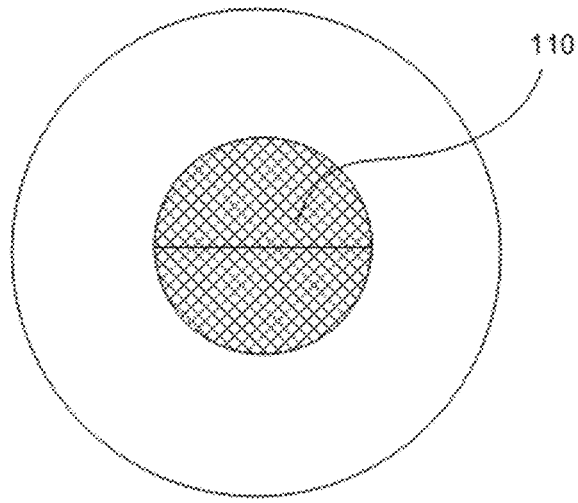

FIGS. 1A-1C schematically illustrate an example of a device 100 comprising a reconstructable visual code 110 with multiple segments. Referring to FIG. 1A, the reconstructable visual code 110 of the device 100 is segmented into two segments: a first segment 110-1 and a second segment 110-2. The first segment 110-1 may be added (e.g., printed, machined, glued) to an entire surface of a first leaflet of the device 100. The second segment 110-2 may be added to an entire surface of a second leaflet of the device 100. The device 100 can further comprise a cover 102 with an opening 104. Prior to reconstruction of the reconstructable visual code 110, the first segment 110-1 and/or the second segment 110-2 of the reconstructable visual code 110 may be "hidden" by (or under) a portion of the cover 102 that is not the opening 104. Thus, a visual scanning system (e.g., a sensor) may not be able to detect a visual code 110 encoded by the reconstructable visual code 110. One or both of the first segment 110-1 and the second segment 110-2 can be operatively coupled to one or more actuation elements (e.g., springs or motors) configured to combine the two segments 110-1 and 110-2. The first and/or second leaflet of the device 100 may be moveable relative to each other (and/or relative to the opening 104). Such movement of the leaflets may be lateral and/or rotational relative to a center of the opening 103. Referring to FIG. 1B, a gap of the two segments 110-1 and 110-2 may be decreased (e.g., by the actuation element(s)) during reconstruction of the reconstructable visual code 110, thereby exposing at least a portion of the first segment 110-1 and/or the second segment 110-2 through the opening 104 of the cover 102. Referring to FIG. 1C, the gap between the two segments 110-1 and 110-2 may be entirely or substantially closed off, such that the reconstructable visual code 110 is reconstructed to reveal the encoded visual code 110 that can be detected by the visual scanning system.

The reconstructable visual code 110 of the device 100 may be segmented into at least about 2, 3, 4, 5, 6, 7, 8, 9, 10, or more segments. The reconstructable visual code 110 of the device 100 may be segmented into at most about 10, 9, 8, 7, 6, 5, 4, 3, or 2 segments. Each segment of the reconstructable visual code 110 may cover at least about 1, 5, 10, 20, 30, 40, 50, 60, 70, 80, 90, or 100 percent (%) of a surface of the leaflet. Each segment of the reconstructable visual code 110 may cover at most about 100, 95, 90, 80, 70, 60, 50, 40, 30, 20, 10, 5, 1, or less % of a surface of the leaflet. The cover 102 may include at least about 1, 2, 3, 4, 5, or more openings configured to expose the visual code that is encoded in the reconstructable visual code 110. The cover 102 may include at most about 5, 4, 3, 2, or 1 opening configured to expose the visual code that is encoded in the reconstructable visual code 110. The opening 104 of the cover 102 may be at least about 1, 5, 10, 20, 30, 40, 50, 60, 70, 80, 90, or more % of an area of the cover 102. The opening 104 of the cover 102 may be at most about 90, 80, 70, 60, 50, 40, 30, 20, 10, 5, 1, or less % of an area of the cover 102. The opening 104 may or may not have an additional cover that shields and/or exposes the opening 104, thereby to shield and/or expose anything that is shown through the opening 104 of the cover 102 (e.g., the reconstructed visual code). When reconstructed, segments of the reconstructable visual code 110 may or may not overlap with each other. At least about 1, 5, 10, 20, 30, 40, 50, 60, 70, 80, 90, or more % of an area of a first segment of the reconstructable visual code 110 may overlap with a second segment of the reconstructable visual code 110. At most about 90, 80, 70, 60, 50, 40, 30, 20, 10, 5, 1, or none of an area of a first segment of the reconstructable visual code 110 may overlap with a second segment of the reconstructable visual code 110. When not overlapping, the sides (e.g., edges) of the segments of the reconstructable visual code 110 may or may not be in contact. The opening 104 of the cover 102 may be hollow. Alternatively, the opening 104 of the cover 102 may be a material that is transparent or semi-transparent, such that any object under the opening 104 may be visible to the naked eye and/or detectable by the visual scanning system.

One or more features or embodiments of the device 100 comprising the reconstructable visual code 110 provided herein may be utilized to generate any of the embodiments of additional devices (e.g., device 200, 300, 400, etc.) provided elsewhere in the present disclosure.

One or more features of the devices comprising the reconstructable visual code, as provided in FIGS. 1-14, may be modified and/or combined to generate new reconstructable codes.

Figure 2A:
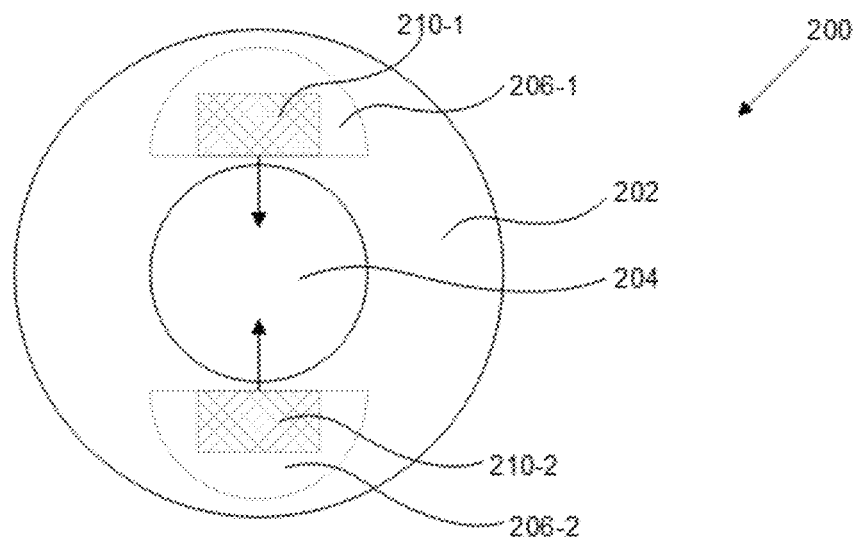
FIGS. 2A-2C schematically illustrate an example of a device comprising a reconstructable visual code with two segments.
Figure 2B:
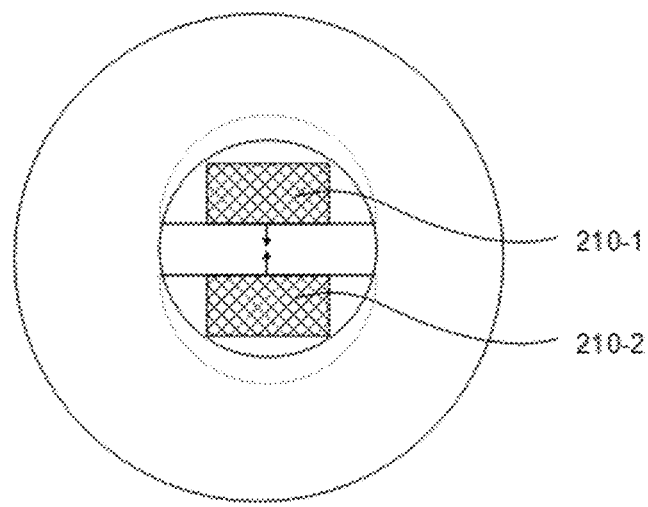
Figure 2C:
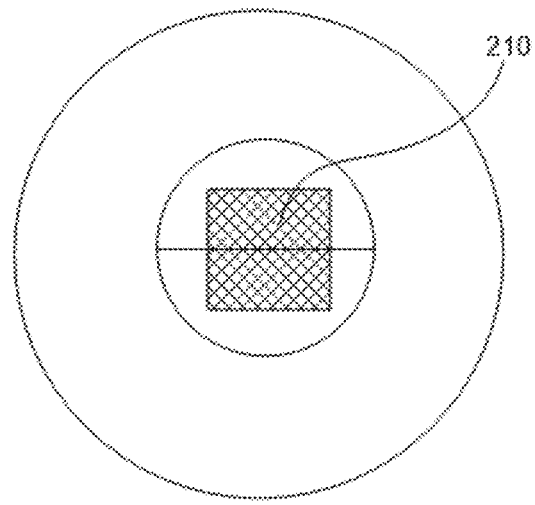

FIGS. 2A-2C schematically illustrate an example of a device 200 comprising a reconstructable visual code 210 with multiple segments. Referring to FIG. 2A, the reconstructable visual code 210 of the device 200 is segmented into two segments: a first segment 210-1 and a second segment 210-2. The first segment 210-1 may be added (e.g., printed, machined, glued) to a portion of a surface of a first leaflet 206-1 of the device 200. The second segment 210-2 may be added to a portion of a surface of a second leaflet 206-2 of the device 200. The device 200 can further comprise a cover 202 with an opening 204. Prior to reconstruction of the reconstructable visual code 210, the first segment 210-1 and/or the second segment 210-2 of the reconstructable visual code 210 may be "hidden" by (or under) a portion of the cover 202 that is not the opening 204. Thus, a visual scanning system (e.g., a sensor) may not be able to detect a visual code encoded 210 by the reconstructable visual code 210. One or both of the first segment 210-1 and the second segment 210-2 can be operatively coupled to one or more actuation elements (e.g., springs or motors) configured to combine the two segments 210-1 and 210-2. The first and/or second leaflet 206-1 and 206-2 may be moveable relative to each other (and/or relative to the opening 204). Referring to FIG. 2B, a gap of the two segments 210-1 and 210-2 may be decreased (e.g., by the actuation element(s)) during reconstruction of the reconstructable visual code 210, thereby exposing at least a portion of the first segment 210-1 and/or the second segment 210-2 through the opening 204 of the cover 202. Referring to FIG. 2C, the gap between the two segments 210-1 and 210-2 may be entirely or substantially closed off, such that the reconstructable visual code 210 is reconstructed to reveal the encoded visual code 210 that can be detected by the visual scanning system.

FIGS. 2D and 2E schematically illustrate another example of the device 200 comprising a reconstructable visual code 210 with multiple segments. Referring to FIG. 2D, the visual code 210 encoded by the first and second segments 210-1 and 210-2 can be a matrix visual code, such as a QR code. The first and second segments 210-1 and 210-2 of the QR code may be outside of the view through the opening 204 of the cover 202 of the device 200. Referring to FIG. 2E, the gap between the two segments 210-1 and 210-2 of the QR code may be entirely or substantially closed off, such that the reconstructable visual code 210 is reconstructed to reveal the encoded QR code 210 that can be detected by the visual scanning system (e.g., a camera of a personal device, such as, for example, a mobile device).

Figure 3A:
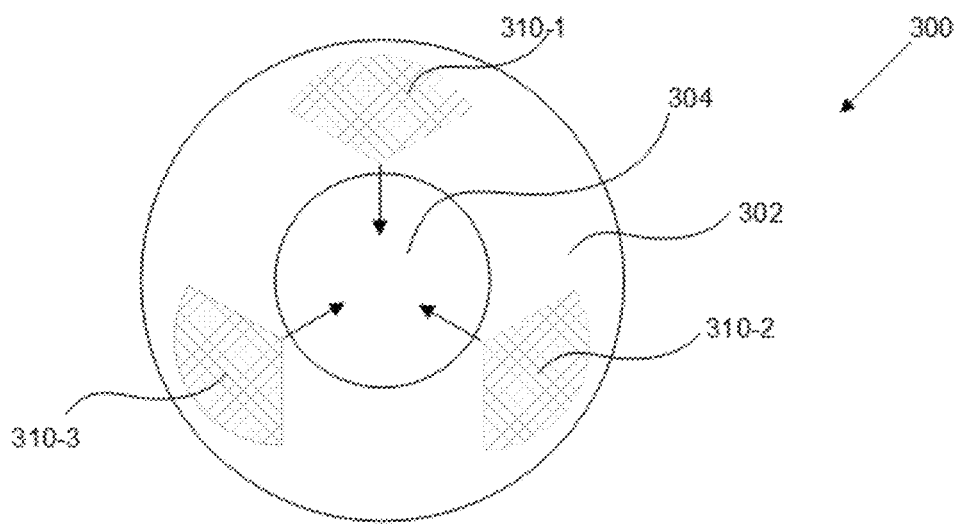
FIGS. 3A-3C schematically illustrate an example of a device comprising a reconstructable visual code with three segments.
Figure 3B:
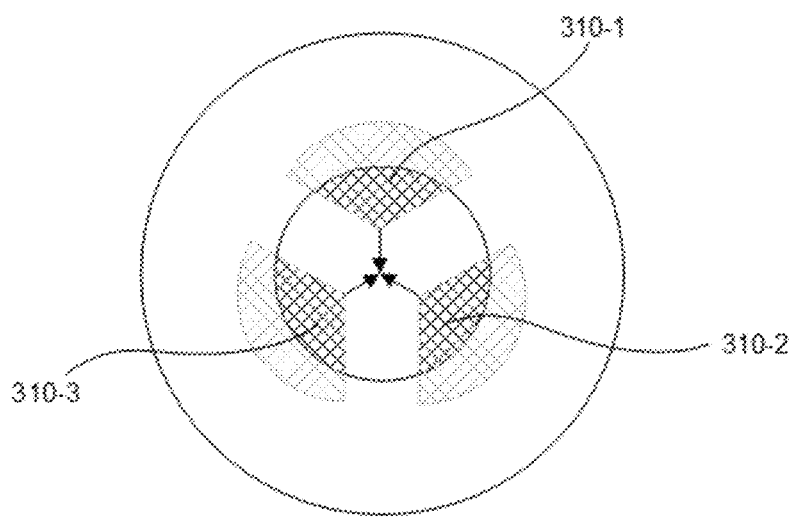
Figure 3C:
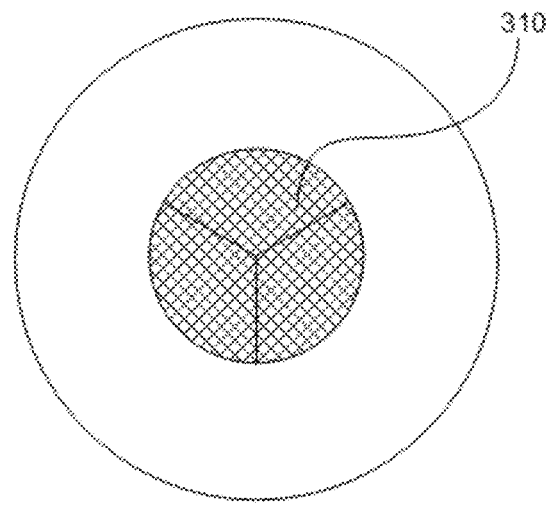

FIGS. 3A-3C schematically illustrate an example of a device 300 comprising a reconstructable visual code 310 with multiple segments. Referring to FIG. 3A, the reconstructable visual code 310 of the device 300 is segmented into three segments: a first segment 310-1, a second segment 310-2, and a third segment 310-3. The first segment 310-1 may be added (e.g., printed, machined, glued) to an entire surface of a first leaflet of the device 300. The second segment 310-2 may be added to an entire surface of a second leaflet of the device 300. The third segment 310-3 may be added to an entire surface of a third leaflet of the device 300. The device 300 can further comprise a cover 302 with an opening 304. Prior to reconstruction of the reconstructable visual code 310, the first segment 310-1, the second segment 310-2, and/or the third segment 310-3 of the reconstructable visual code 310 may be "hidden" by (or under) a portion of the cover 302 that is not the opening 304. Thus, a visual scanning system (e.g., a sensor) may not be able to detect a visual code 310 encoded by the reconstructable visual code 310. At least one of the first, second, and third segments 310-1, 310-2, and 310-3 can be operatively coupled to one or more actuation elements (e.g., springs or motors) configured to combine the three segments 310-1, 310-2, and 310-3. The first, second, and/or third leaflet of the device 300 may be moveable relative to each other (and/or relative to the opening 304). Referring to FIG. 3B, a gap among the three segments 310-1, 310-2, and 310-3 may be decreased (e.g., by the actuation element(s)) during reconstruction of the reconstructable visual code 310, thereby exposing at least a portion of the first segment 310-1, second segment 310-2, and/or the third segment 310-3 through the opening 304 of the cover 302. Referring to FIG. 3C, the gap among the three segments 310-1, 310-2, and 310-3 may be entirely or substantially closed off, such that the reconstructable visual code 310 is reconstructed to reveal the encoded visual code 310 that can be detected by the visual scanning system.

Figure 4A:
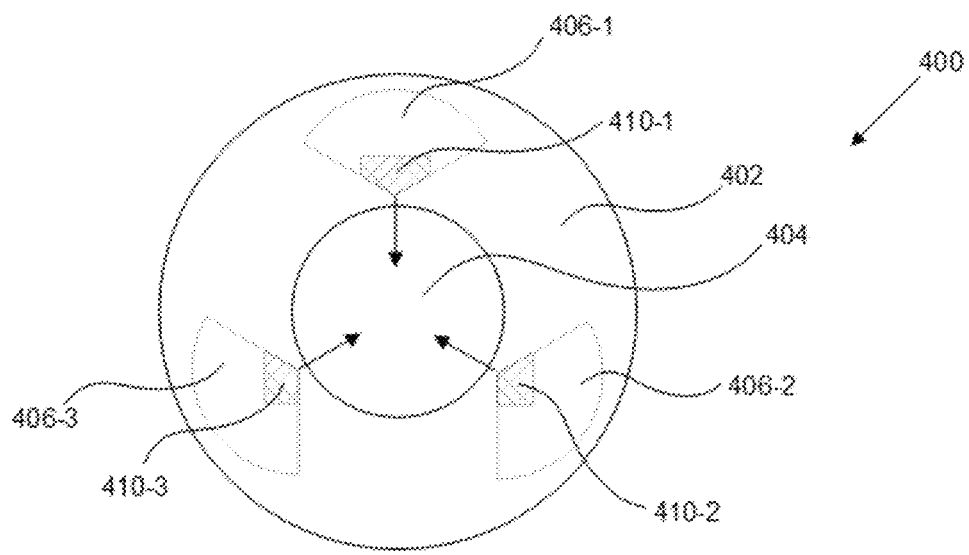
FIGS. 4A-4C schematically illustrate another example of a device comprising a reconstructable visual code with three segments.
Figure 4B:
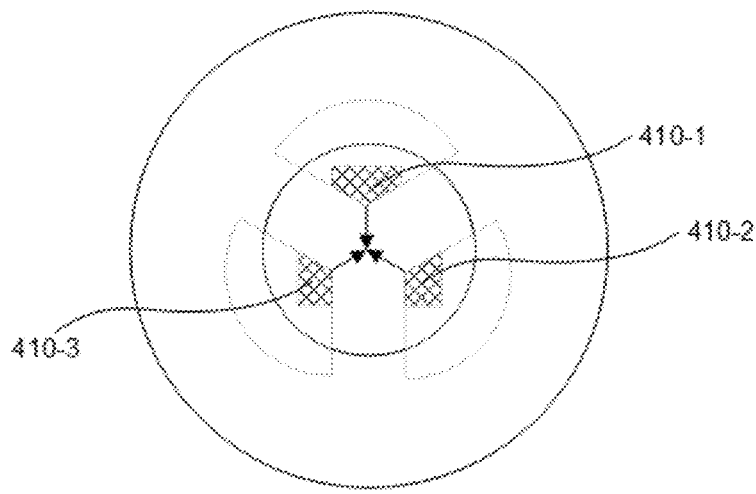
Figure 4C:
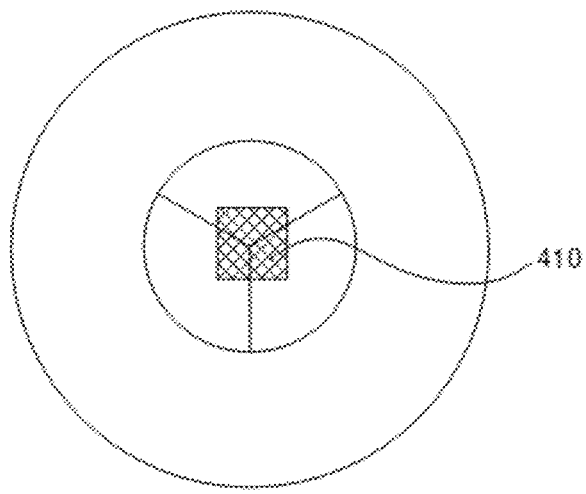

FIGS. 4A-4C schematically illustrate an example of a device 400 comprising a reconstructable visual code 410 with multiple segments. Referring to FIG. 4A, the reconstructable visual code 410 of the device 400 is segmented into three segments: a first segment 410-1, a second segment 410-2, and a third segment 410-3. The first segment 410-1 may be added (e.g., printed, machined, glued) to a portion of a surface of a first leaflet 406-1 of the device 400. The second segment 410-2 may be added to a portion of a surface of a second leaflet 406-2 of the device 400. The third segment 410-3 may be added to a portion of a surface of a third leaflet 406-3 of the device 400. The device 400 can further comprise a cover 402 with an opening 404. Prior to reconstruction of the reconstructable visual code 410, the first segment 410-1, the second segment 410-2, and/or the third segment 410-3 of the reconstructable visual code 410 may be "hidden" by (or under) a portion of the cover 402 that is not the opening 404. Thus, a visual scanning system (e.g., a sensor) may not be able to detect a visual code encoded 410 by the reconstructable visual code 410. At least one of the first, second, and third segments 410-1, 410-2, and 410-3 can be operatively coupled to one or more actuation elements (e.g., springs or motors) configured to combine the three segments 410-1, 410-2, and 410-3. The first, second, and/or third leaflet 406-1, 406-2, and/or 406-3 of the device 400 may be moveable relative to each other (and/or relative to the opening 404). Referring to FIG. 4B, a gap among the three segments 410-1, 410-2, and 410-3 may be decreased (e.g., by the actuation element(s)) during reconstruction of the reconstructable visual code 410, thereby exposing at least a portion of the first segment 410-1, second segment 410-2, and/or the third segment 410-3 through the opening 404 of the cover 402. Referring to FIG. 4C, the gap among the three segments 410-1, 410-2, and 410-3 may be entirely or substantially closed off, such that the reconstructable visual code 410 is reconstructed to reveal the encoded visual code 410 that can be detected by the visual scanning system.

Figures 4D, 4E:
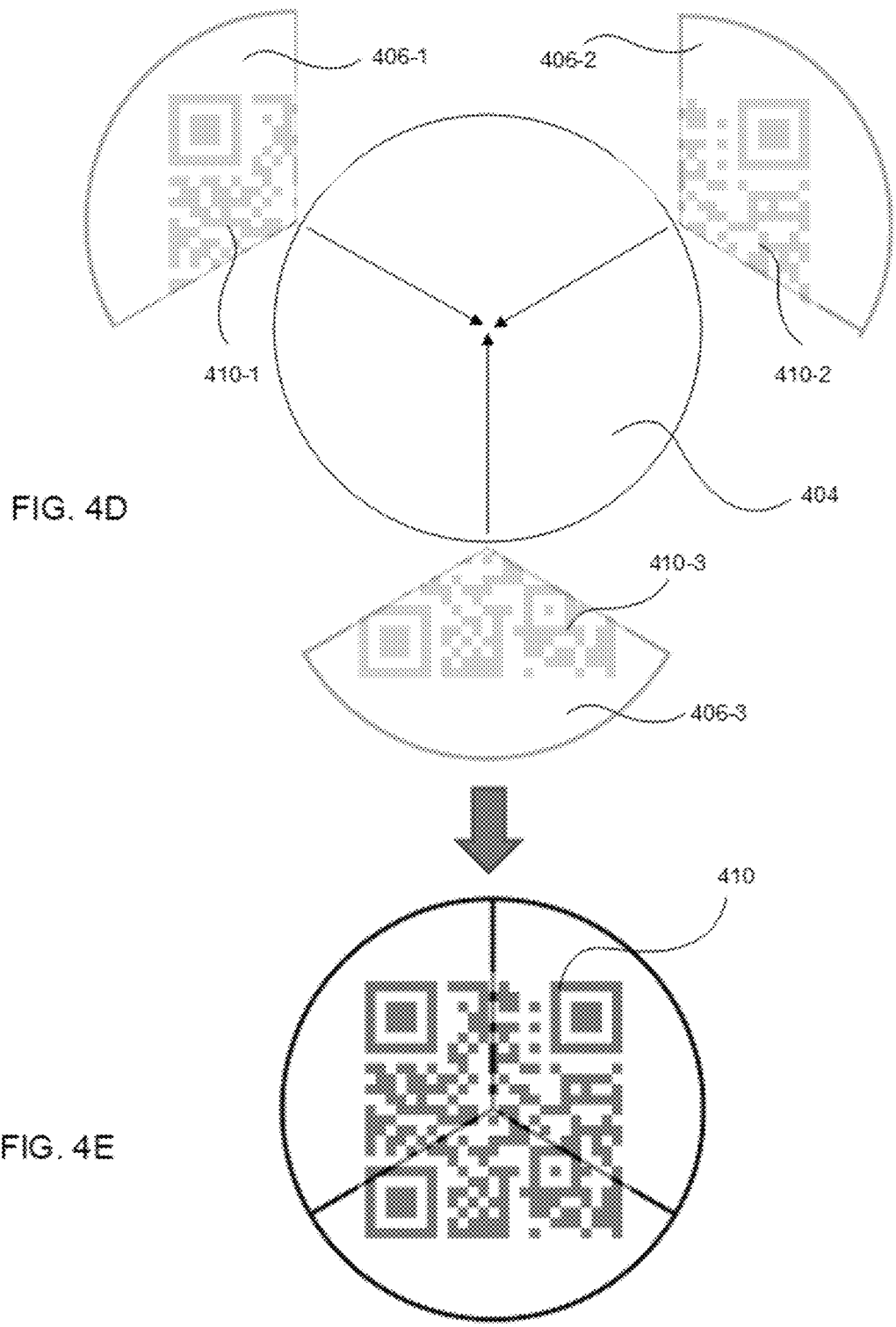
FIGS. 4D and 4E schematically illustrate a different example of the device comprising a reconstructable matrix code with three segments.

FIGS. 4D and 4E schematically illustrate another example of the device 400 comprising a reconstructable visual code 410 with multiple segments. Referring to FIG. 4D, the visual code 410 encoded by the first, second, and third segments 410-1, 410-2, and 410-3 can be a matrix visual code, such as a QR code. At least one of the first, second, and third segments 410-1, 410-2, and 410-3 of the QR code may be outside of the view through the opening 404 of the cover 402 of the device 400. Referring to FIG. 4E, a gap among the three segments 410-1, 410-2, and 410-3 of the QR code may be entirely or substantially closed off, such that the reconstructable visual code 410 is reconstructed to reveal the encoded QR code 410 that can be detected by the visual scanning system (e.g., a camera of a personal device, such as, for example, a mobile device).

Figure 5A:
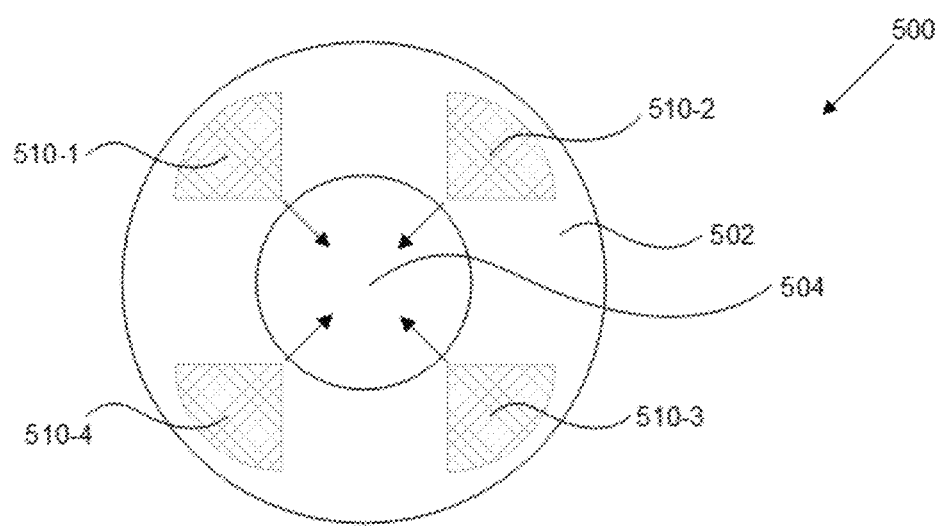
FIGS. 5A-5C schematically illustrate an example of a device comprising a reconstructable visual code with four segments.
Figure 5B:
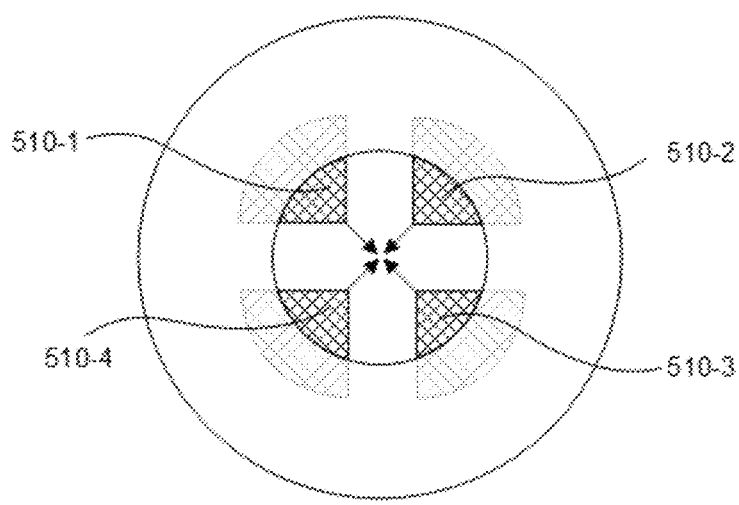
Figure 5C:
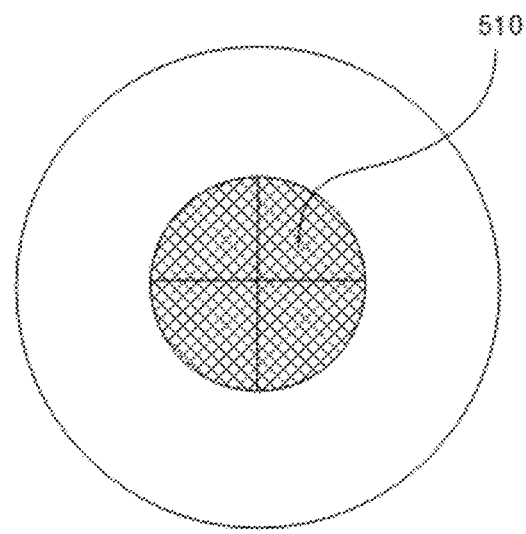

FIGS. 5A-5C schematically illustrate an example of a device 500 comprising a reconstructable visual code 510 with multiple segments. Referring to FIG. 5A, the reconstructable visual code 510 of the device 500 is segmented into four segments: a first segment 510-1, a second segment 510-2, a third segment 510-3, and a fourth segment 510-4. The first segment 510-1 may be added (e.g., printed, machined, glued) to at least a portion of a surface of a first leaflet of the device 500. The second segment 510-2 may be added to at least a portion of a surface of a second leaflet of the device 500. The third segment 510-3 may be added to at least a portion of a surface of a third leaflet of the device 500.

The fourth segment 510-4 may be added to at least a portion of a surface of a fourth leaflet of the device 500. The device 500 can further comprise a cover 502 with an opening 504. Prior to reconstruction of the reconstructable visual code 510, the first segment 510-1, the second segment 510-2, the third segment 510-3, and/or the fourth segment 510-4 of the reconstructable visual code 510 may be "hidden" by (or under) a portion of the cover 502 that is not the opening 504. Thus, a visual scanning system (e.g., a sensor) may not be able to detect a visual code encoded 510 by the reconstructable visual code 510. At least one of the first, second, third, and third segments 510-1, 510-2, 510-3, and 510-4 can be operatively coupled to one or more actuation elements (e.g., springs or motors) configured to combine the four segments 510-1, 510-2, 510-3, and 510-4. The first, second, third, and/or fourth leaflet of the device 400 may be moveable relative to each other (and/or relative to the opening 504). Referring to FIG. 5B, a gap among the four segments 510-1, 510-2, 510-3, and 510-4 may be decreased (e.g., by the actuation element(s)) during reconstruction of the reconstructable visual code 510, thereby exposing at least a portion of the first segment 510-1, second segment 510-2, the third segment 510-3, and/or the fourth segment 510-4 through the opening 504 of the cover 502. Referring to FIG. 5C, the gap among the four segments 510-1, 510-2, 510-3, and 510-4 may be entirely or substantially closed off, such that the reconstructable visual code 510 is reconstructed to reveal the encoded visual code 510 that can be detected by the visual scanning system.

Figure 6A:
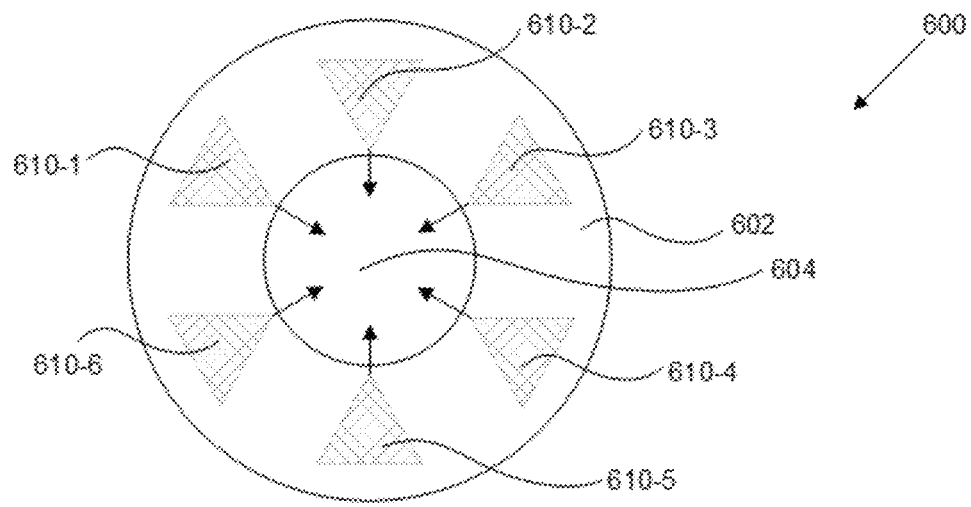
FIGS. 6A-6C schematically illustrate an example of a device comprising a reconstructable visual code with six segments.
Figure 6B:
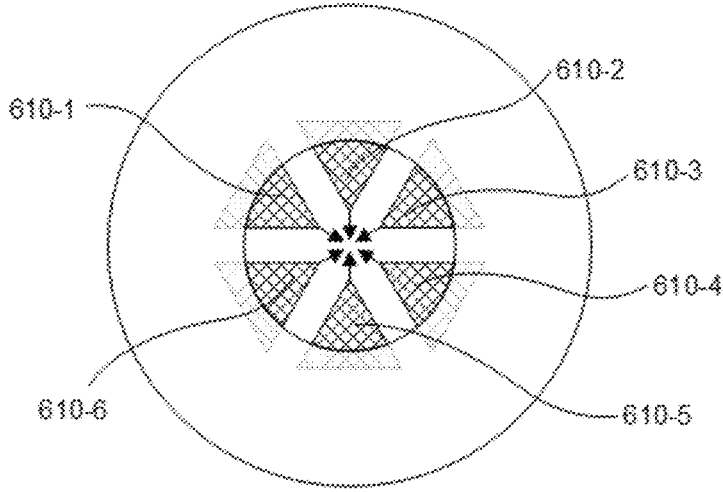
Figure 6C:
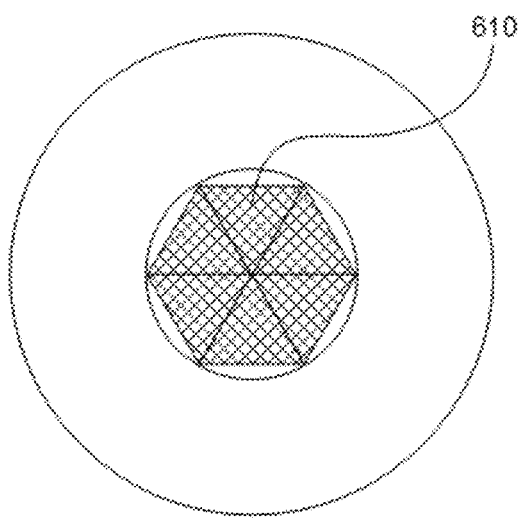

FIGS. 6A-6C schematically illustrate an example of a device 600 comprising a reconstructable visual code 610 with multiple segments. Referring to FIG. 6A, the reconstructable visual code 610 of the device 600 is segmented into six segments: a first segment 610-1, a second segment 610-2, a third segment 610-3, a fourth segment 610-4, a fifth segment 610-5, and a sixth segment 610-6. Each of the six segments 610-1, 610-2, 610-3, 610-4, 610-5, and 610-6 may be added (e.g., printed, machined, glued) to at least a portion of a surface of a respective leaflet of the device 600. The device 600 can further comprise a cover 602 with an opening 604. Prior to reconstruction of the reconstructable visual code 610, the first, second, third, fourth, fifth, and/or sixth segment 610-1, 610-2, 610-3, 610-4, 610-5, and/or 610-6 of the reconstructable visual code 610 may be "hidden" by (or under) a portion of the cover 602 that is not the opening 604. Thus, a visual scanning system (e.g., a sensor) may not be able to detect a visual code encoded 610 by the reconstructable visual code 610. At least one of the first, second, third, fourth, fifth, and sixth segment 610-1, 610-2, 610-3, 610-4, 610-5, and 610-6 can be operatively coupled to one or more actuation elements (e.g., springs or motors) configured to combine the six segments 610-1, 610-2, 610-3, 610-4, 610-5, and/or 610-6. The first, second, third, fourth, fifth, and/or sixth leaflet of the device 600 may be moveable relative to each other (and/or relative to the opening 604). Referring to FIG. 6B, a gap among the six segments 610-1, 610-2, 610-3, 610-4, 610-5, and 610-6 may be decreased (e.g., by the actuation element(s)) during reconstruction of the reconstructable visual code 610, thereby exposing at least a portion of the first, second, third, fourth, fifth, and/or sixth segment 610-1, 610-2, 610-3, 610-4, 610-5, and/or 610-6 through the opening 604 of the cover 602. Referring to FIG. 6C, the gap among the six segments 610-1, 610-2, 610-3, 610-4, 610-5, and 610-6 may be entirely or substantially closed off, such that the reconstructable visual code 610 is reconstructed to reveal the encoded visual code 610 that can be detected by the visual scanning system.

Figure 7A:
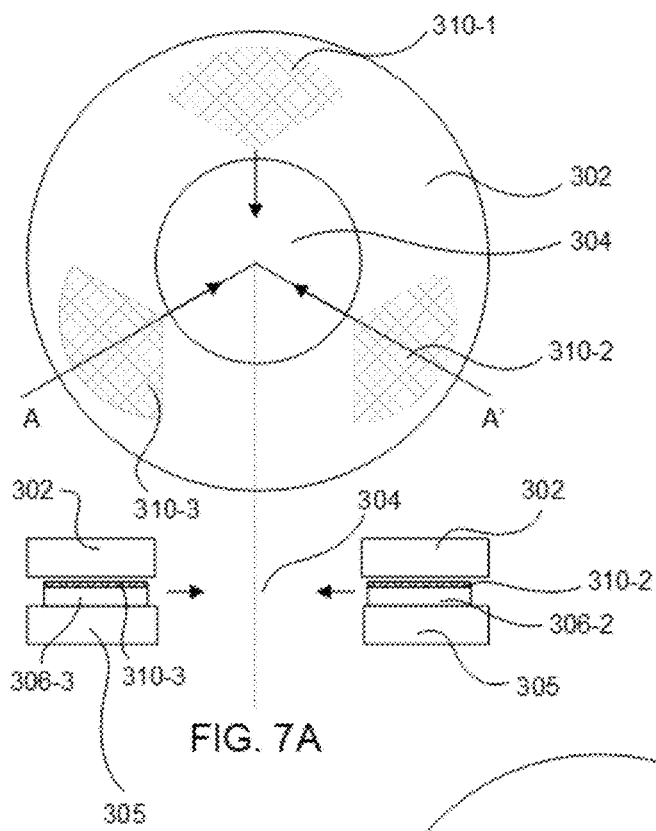
FIGS. 7A-7C schematically illustrate top and side views of a device comprising a reconstructable visual code with three segments, FIGS. 8A-8B schematically illustrate an example of a device comprising a reconstructable visual code with two segments.
Figure 7B:
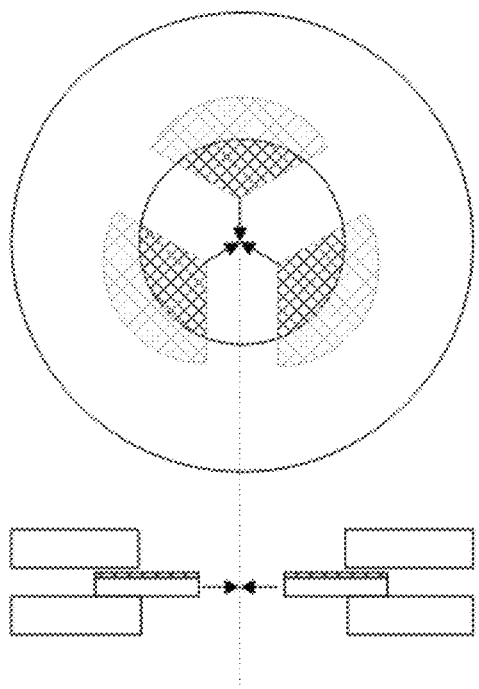
Figure 7C:
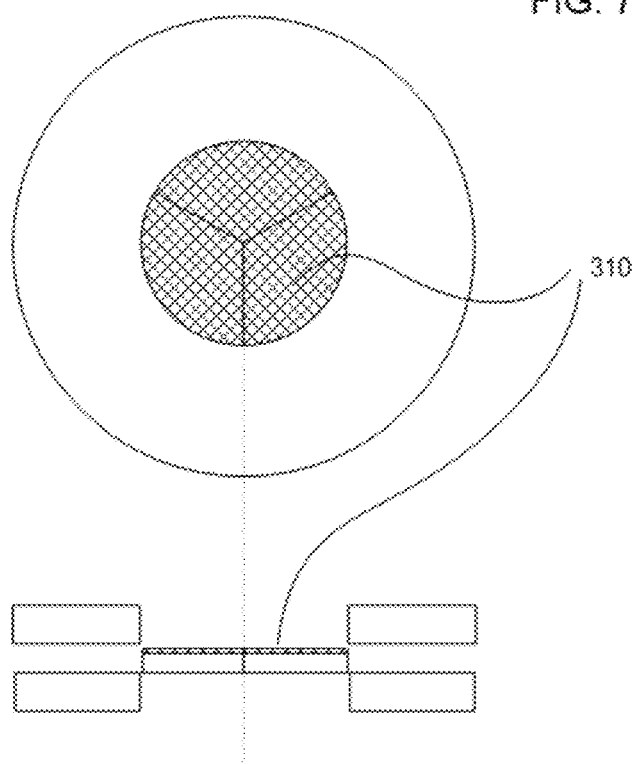

FIGS. 7A-7C schematically illustrate top and side views of the device 300 comprising a reconstructable visual code 310 with three segments 310-1, 310-2, and 310-3. Referring to FIG. 7A, the three segments 310-1, 310-2, and 310-3 are disposed adjacent to or on at least a portion of a surface of three leaflets 306-1, 306-2, and 306-3, respectively. Each of the leaflets 306-1, 306-2, and 306-3 that carries each of the three segments 310-1, 310-2, and 310-3, respectively, can be movable relative to each other, relative to the opening 304 of the cover 302, and/or relative to a plate 305 of the device 300. The plate 305 may have an opening (e.g., a ring-shaped plate) that aligns with the opening 304 of the cover 302. Alternatively, in some cases, the plate 305 may not have an opening that aligns with the opening 304 of the cover 302. Referring to FIG. 7B, the gap among the three segments 310-1, 310-2, and 310-3 may be decreased (e.g., by the actuation element(s)) during reconstruction of the reconstructable visual code 310, thereby exposing at least a portion of the first, second, and/or third segments 310-1, 310-2, and/or 310-3 through the opening 304 of the cover 302. Referring to FIG. 7C, the gap among the three segments 310-1, 310-2, and 310-3 may be entirely or substantially closed off, such that the reconstructable visual code 310 is reconstructed to reveal the encoded visual code 310 that can be detected by the visual scanning system. The three segments 310-1, 310-2, and 310-3 may converge at a center of the opening 304 of the cover 302.

Figure 8A:
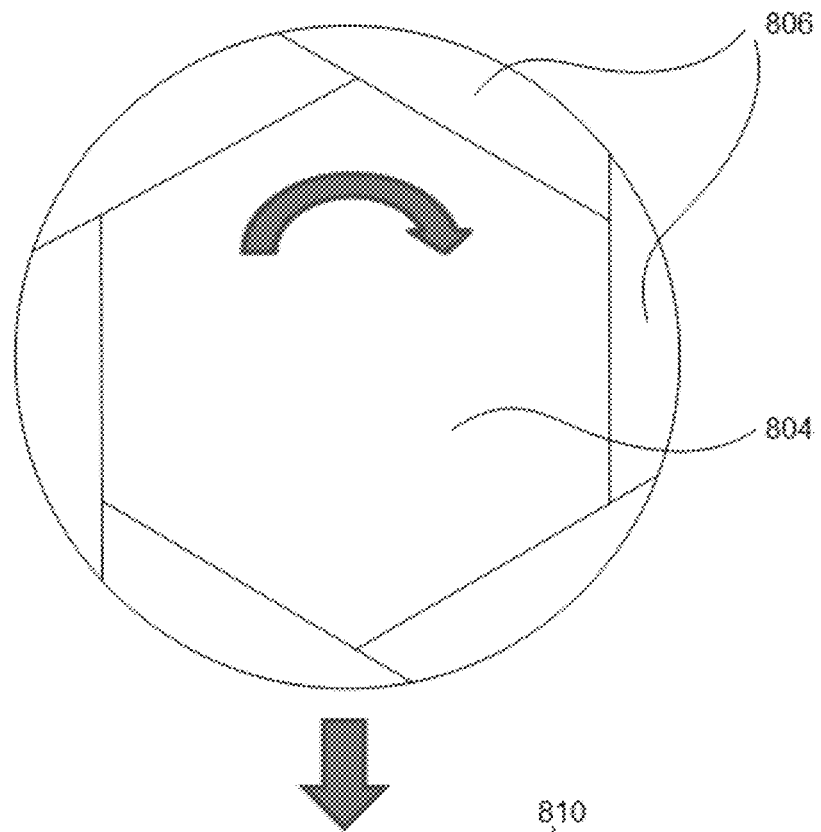
Figure 8B:
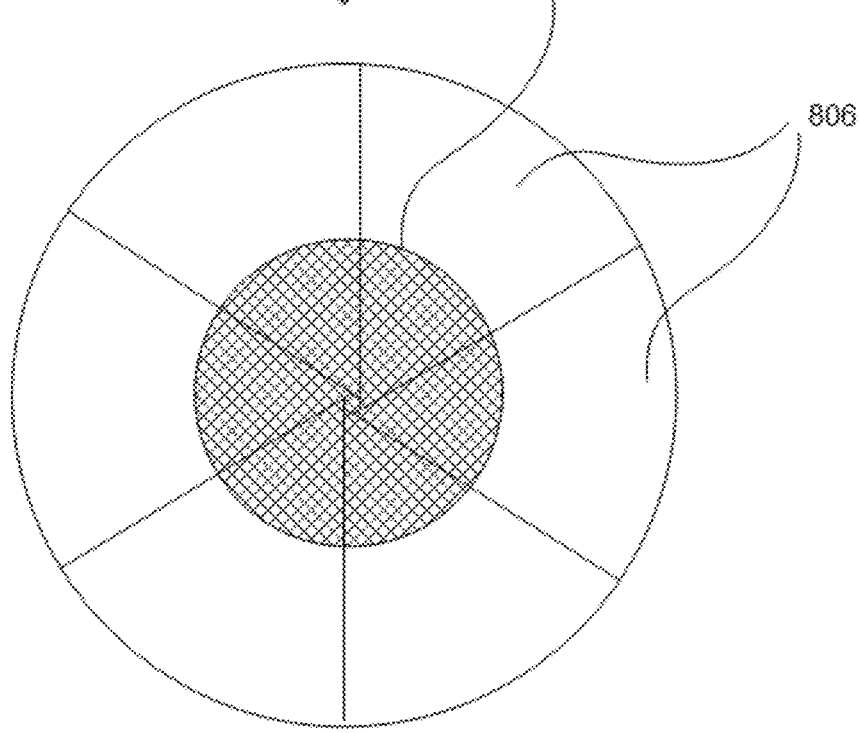

FIG. 8A-8B schematically illustrate an example of a device 800 comprising a reconstructable visual code with six segments. Referring to FIG. 8A, the device 800 comprises six leaflets 806, each of which carries one of the six segments of the reconstructable visual code. Prior to reconstruction of the visual code, at least one of the six leaflets 806 are disposed (e.g., under a cover of the device 800), such that at least one of the six segments of the reconstructable visual code may be "hidden" and out be detectable through the opening of the cover. The six leaflets 806 may be configured to rotate towards a center of the opening 804, such that, referring to FIG. 8B, the six leaflets may be brought together and the reconstructable visual code is reconstructed to reveal the encoded visual code 810. Movement (e.g., rotation) of the leaflets of the device 800 required to reconstruct the visual code 810 may be similar to an iris diaphragm of an aperture of a camera.

Figure 9:
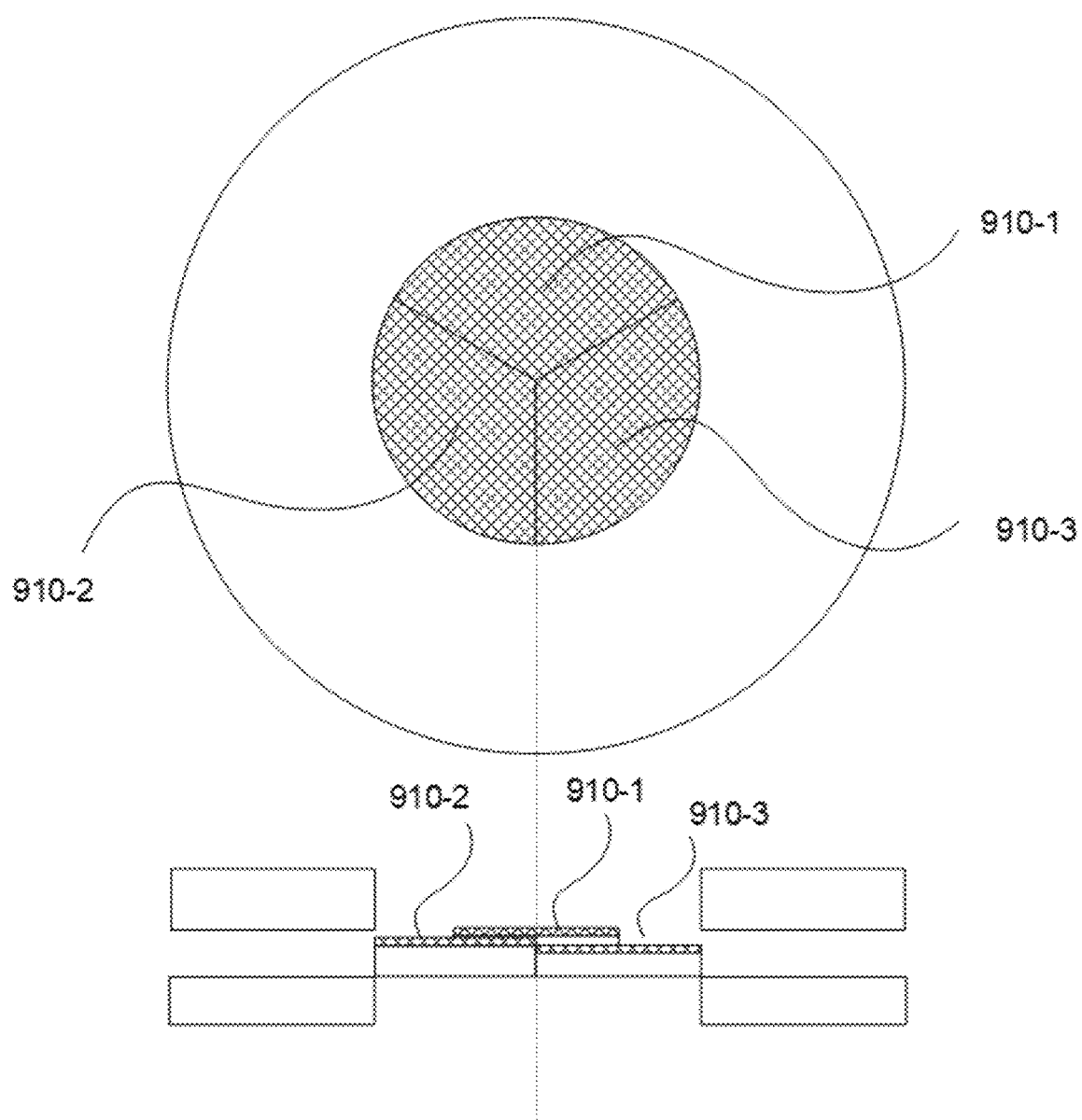
FIG. 9 schematically illustrates top and side views of a device comprising a reconstructable visual code with three partially overlapping segments.

FIG. 9 schematically illustrates top and side views of a device 900 comprising a reconstructable visual code with three partially overlapping segments 910-1, 910-2, and 910-3. When the visual code 910 is reconstructed, at least one of the three segments 910-1, 910-2, and 910-3 may overlap with one of the other remaining segments (e.g., segment 910-2 and/or segment 910-3). As illustrated in FIG. 9, a portion of the first segment 910-1 of the visual code may overlap with a portion of the second segment 910-2 of the visual code. Additionally, an additional portion of the first segment 910-1 of the visual code may overlap with a portion of the third segment 910-3 of the visual code. In some cases, the first segment 910-1 of the visual code may not be transparent or semitransparent. Additionally, a first leaflet that is carrying the first segment 910-1 may not be transparent or semitransparent. In such a case, the portion of the second segment 910-2 and the third segment 910-3 that are overlapping with the first segment 910-1 may not be visible through the first segment 910-1. Thus, a unique pattern of the device 900 may be a combination of the exposed surfaces of the three segments 910-1, 910-2, and 910-3. Any portion of any of the three segments 910-1, 910-2, and 910-3 that is disposed under another segment may be excluded from the unique pattern of the exposed surfaces.

Referring to FIG. 9, in some cases, the first segment 910-1 of the visual code may be transparent or semitransparent. Additionally, a first leaflet that is carrying the first segment 910-1 may be transparent or semitransparent. As illustrated, the portion of the second segment 910-2 and the third segment 910-3 that are overlapping with the first segment 910-1 may be visible through the first segment 910-1. Such overlap of the segments 910-1, 910-2, and 910-3 may generate a unique pattern that may be detected by a visual scanning system.

Figure 10:
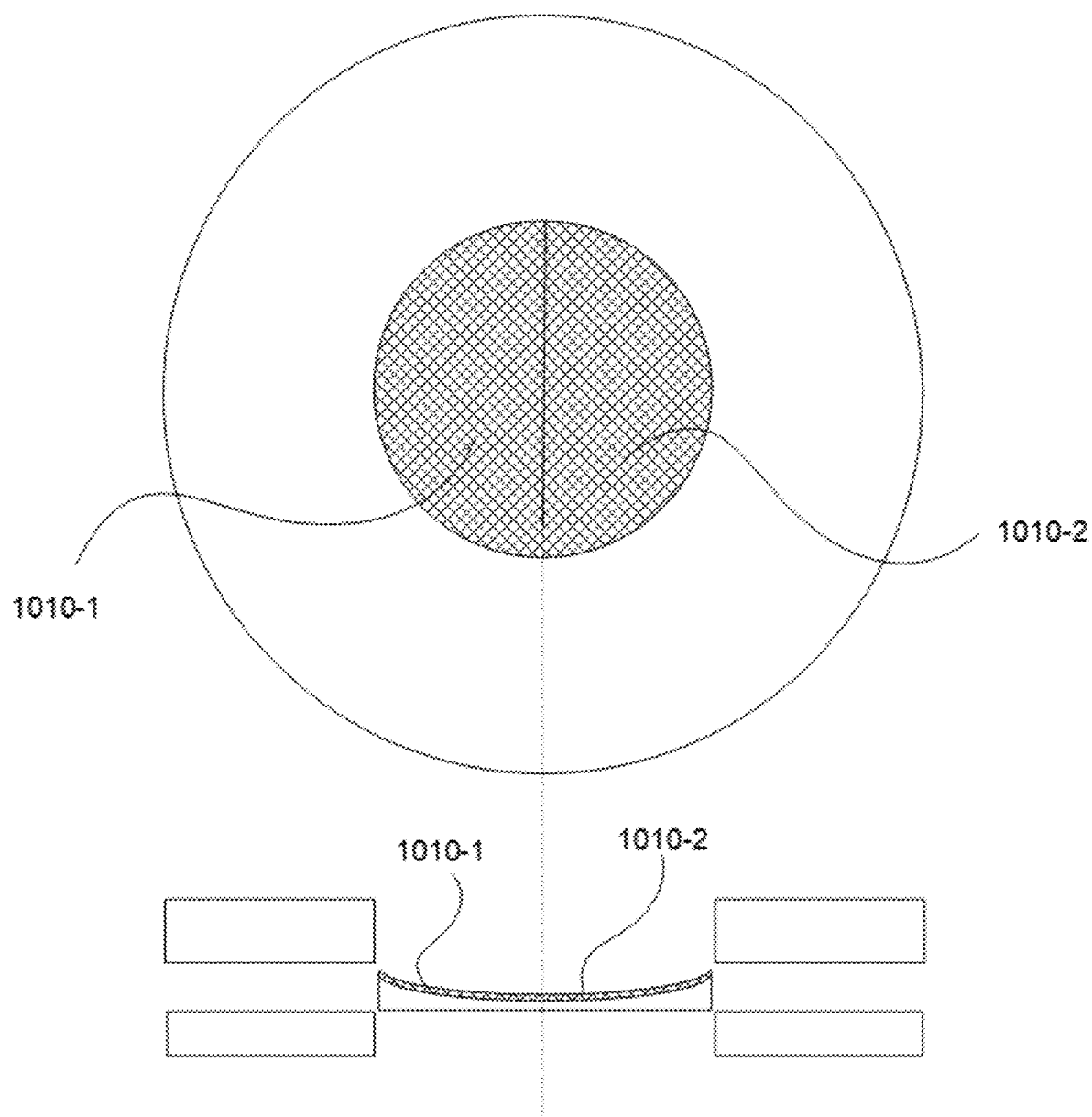
FIG. 10 schematically illustrates an example of a device comprising a 3D reconstructable visual code with multiple segments.

FIG. 10 schematically illustrates top and side views of a device 1000 comprising a 3D reconstructable visual code with multiple segments. The reconstructable visual code of the device 1000 may include two segments 1010-1 and 1010-2. One or both of the two segments 1010-1 and 1010-2 may have a 3D pattern corresponding to the 3D reconstructable visual code. Thus, reconstruction of the two segments may create a unique 3D pattern 1010 that may be detected by a visual scanning system. In some cases, a non-planar aspect of the 3D pattern 1010 may provide an additional "dimension" or aspect of information that is detectable by the visual scanning system.

Referring to FIG. 10, in some cases, the curved structure of the segments 1010-1 and 1010-2 may be due to structural design of the leaflets that are carrying each of the segments, respectively, and the non-planar aspect of the 3D pattern 1010 may not provide any additional "dimension" or aspect of information that is detectable by the visual scanning system. As such, in certain examples, the reconstructable visual code may be applicable to both flat and non-flat surfaces without affecting integrity of the visual code.

Figure 11A:
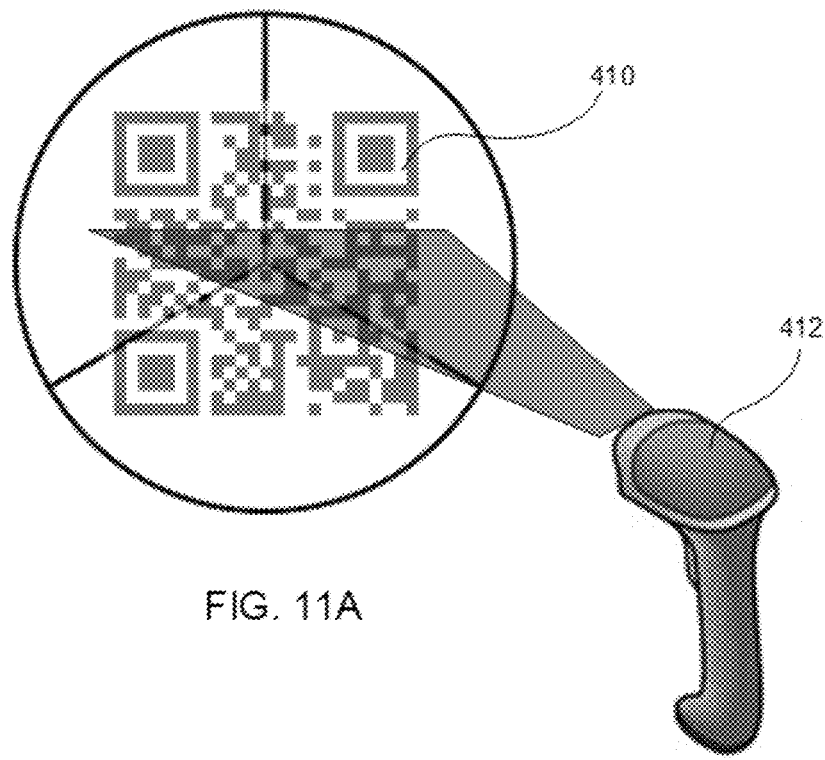
FIGS. 11A and 11B schematically illustrates detection of a unique pattern of a reconstructable visual code of a device with a visual scanning system.

FIG. 11A schematically illustrates using a visual scanning system 412 to detect a unique pattern of the reconstructable visual code 410. In some cases, a plurality of segments (e.g., 3 segments) of the reconstructable visual code 410 may be combined to generate a unique pattern encoded by the reconstructable visual code 410. The unique pattern may be a QR code, and the visual scanning system 412 may be a handheld QR reader/scanner.

Figure 11B:
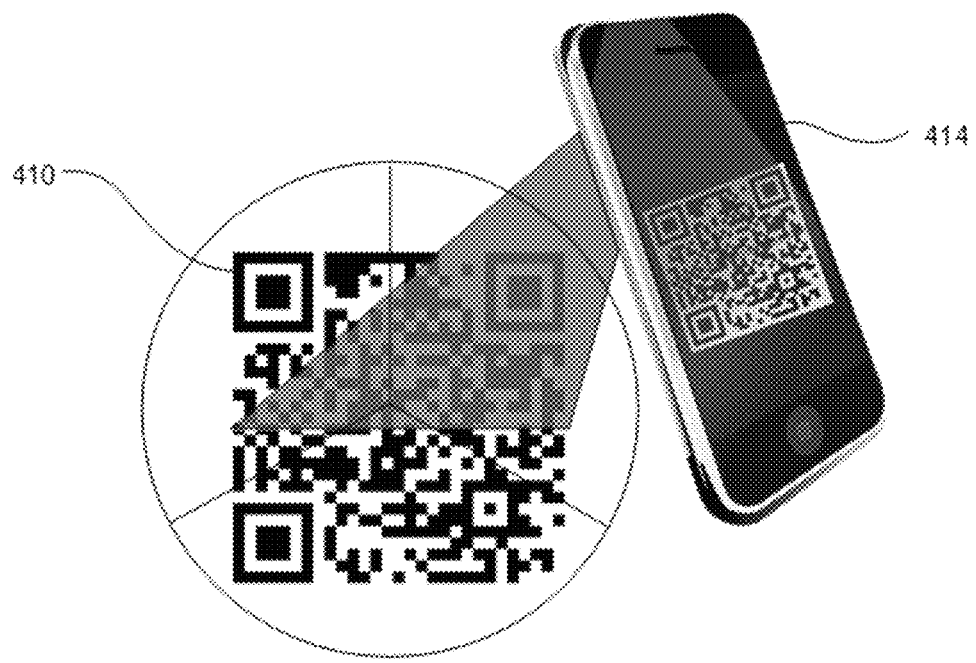

FIG. 11B schematically illustrates using a user's personal device 414 to detect a unique pattern of the reconstructable visual code 410. In some cases, a plurality of segments (e.g., 3 segments) of the reconstructable visual code 410 may be combined to generate a unique pattern encoded by the reconstructable visual code 410. The unique pattern may be a QR code, and one or more cameras of the personal device 414 (e.g., a mobile device) may be used to detect the QR code. A screen and user interface of the personal device 414 may be used to visualize the detected QR code in real time.

Figure 12A:
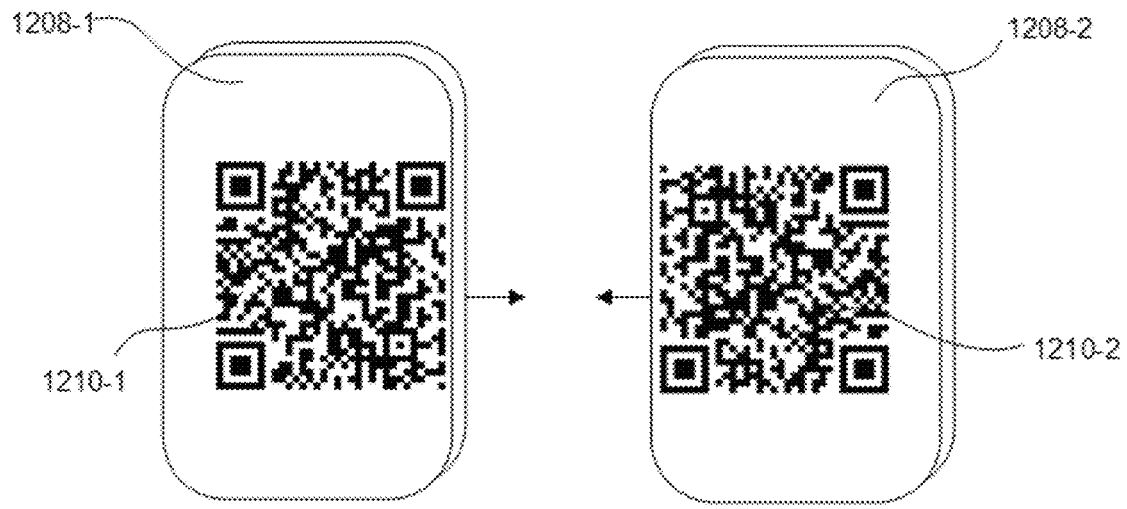
FIGS. 12A and 12B schematically illustrates detection of a unique pattern of a reconstructable visual code of multiple devices with a visual scanning system.
Figure 12B:
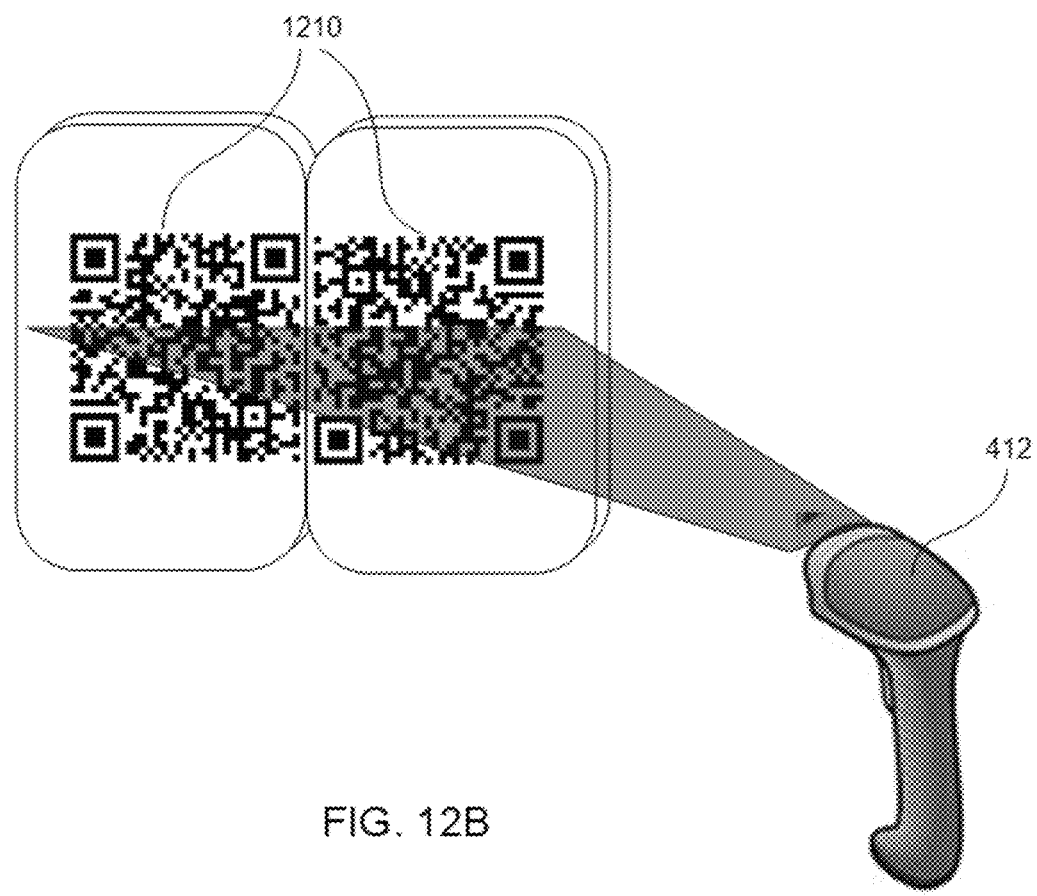

FIGS. 12A and 12B schematically illustrates detection of a unique pattern of a reconstructable visual code 1210 of multiple devices 1200 with the visual scanning system 412. The reconstructable visual code 1210 may be segmented and added (e.g., printed, machined, glued, etc.) to a plurality of devices. The reconstructable visual code 1210 may be segmented and added to at least 2, 3, 4, 5, 6, 7, 8, 9, 10, or more devices (e.g., at least 2, 3, 4, 5, 6, 7, 8, 9, 10, or more segments of the reconstructable visual code 1210, respectively). The reconstructable visual code 1210 may be segmented and added to at most 10, 9, 8, 7, 6, 5, 4, 3, or 2 devices (e.g., at most 10, 9, 8, 7, 6, 5, 4, 3, or 2 segments of the reconstructable visual code 1210, respectively). Referring to FIG. 12A, the reconstructable visual code 1210 is segmented into a first segment 1210-1 and a second segment 1201-2. The first segment 1210-1 may be added to a surface of a first device 1208-1, and the second segment 1210-2 may be added to a surface of a second device 1208-2. Referring to FIG. 12B, bringing the two devices 1208-1 and 1208-2 together can effectively reconstruct the unique pattern of the visual code 1210. Such unique pattern may be detectable by the visual detecting system 412 (e.g., the handheld QR reader/scanner). Such reconstructable visual code may provide one or more benefits, such as, for example, identifying and tracking two or more articles (e.g., luggage, components of a larger system) in a plethora of different articles.

FIGS. 15A-15H schematically illustrate a hidden visual code that can be revealed by augmented reality. The visual code 1510 may be deconstructed into a first portion 1510-1 and a second portion 1510-2. The first portion 1510-1 and the second portion 1510-2 of the visual code may be reconstructed or combined (e.g., by a computer software) in an augmented reality space to generate the functional visual code 1510. The first portion 1510-1 of the visual code may be a physical visual code that is disposed on or adjacent to a physical object. The second portion 1510-2 of the visual code can be a virtual visual code (e.g., a virtual visual code within the augmented reality space). The virtual visual code 1510-2 may be displayed on a graphical user interface (GUI) 1504 of a device 1502 (e.g., an authorized scanner, tablet, or mobile device) of a user. The GUI 1504 may be displayed on a screen (e.g., black and white, or color screen) of the device 1502. Additionally, the device 1502 may comprise a camera 1506 (e.g., a camera disposed on an opposite side of the screen displaying the GUI 1504), and the camera 1506 may be operatively coupled to the device 1502 and the GUI 1504 configured to reconstruct the two portions of the visual code 1510-1 and 1510-2.

In some cases, the virtual visual code 1510-2 may be displayed to the user via the GUI 1504 prior to, during, and/or subsequent to taking the image/video of the physical visual code 1510-1. In some cases, the user may need to activate the GUI 1504 and/or be authorized to use the device 1502 (e.g., by fingerprint and/or retinal screening).

Referring to FIG. 15A, the virtual visual code 1510-2 may be initially hidden or invisible. Referring to FIG. 15B, the device 1502 may need to be brought towards the physical visual code 1510-1 (as indicated by the arrow 1515) within a range (e.g., within a predetermined distance, height, and/or angle) to initiate reconstruction of the visual code 1510. Referring to FIG. 15C, the virtual visual code 1510-2 may be revealed via the GUI 1504 when the device 1502 is brought in proximity to the physical visual code 1510-1 by the user (e.g., by the authorized user). In some cases, the distance between the device 1502 and the physical visual code 1510-1 may be determined by the camera 1506 and/or one or more additional sensors.

Figure 15D:
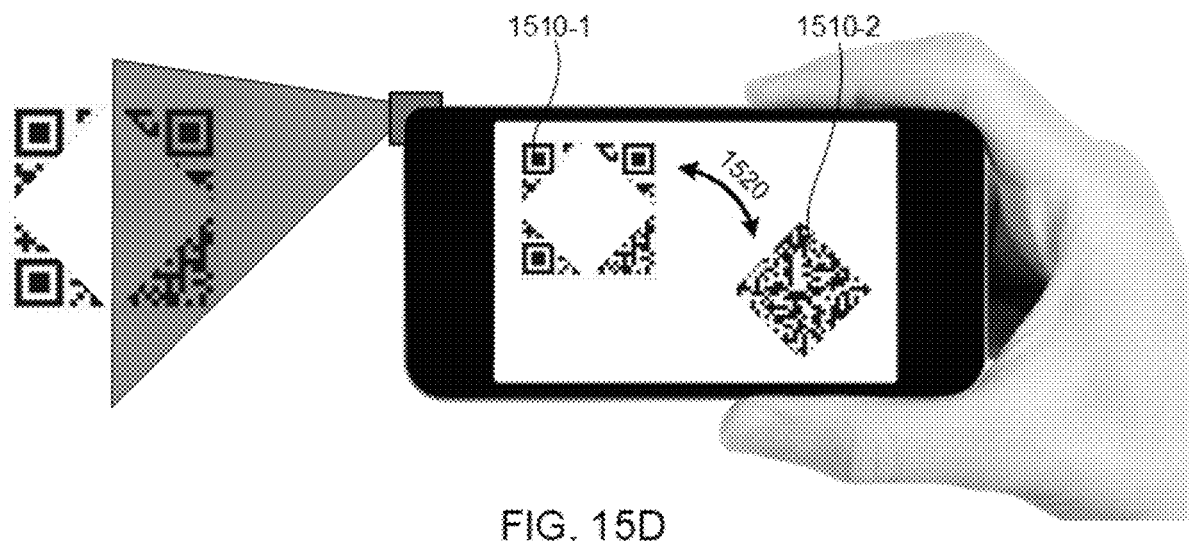
Figure 15E:
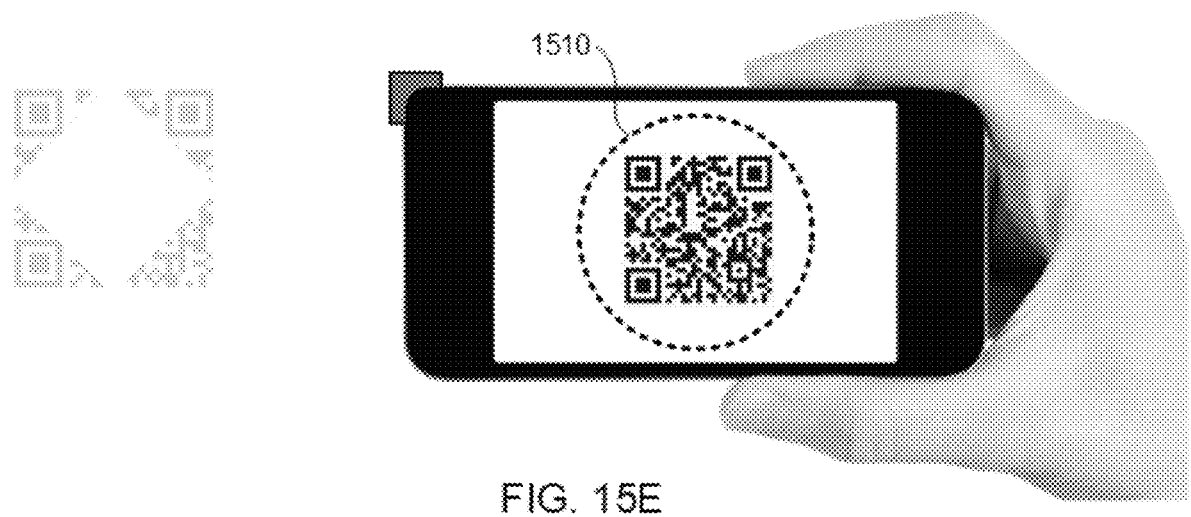

Referring to FIG. 15D, once the virtual visual code 1510-2 is revealed on the GUI 1504, the user may use the camera 1506 to capture an image and/or video of the physical visual code 1510-1, and display the captured image/video of the physical visual code 1510-1 on the GUI 1504 of the device 1502. Once the image/video of the physical visual code 1510-1 is captured and/or displayed by the augmented reality controller (e.g., software), the image/video of the physical visual code 1510-1 may be combined with the virtual visual code 1510-2 (as indicated by the arrow 1520) in the augmented reality space, thereby to reconstruct the visual code. Referring to FIG. 0.15E, the GUI 1504 shows the reconstructed form of the functional visual code 1510.

Figure 15F:
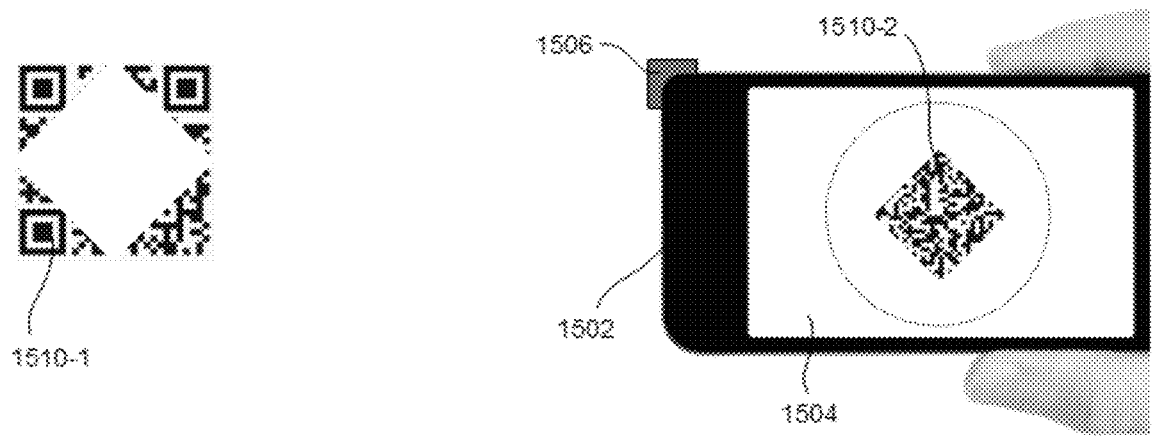
Figure 15G:
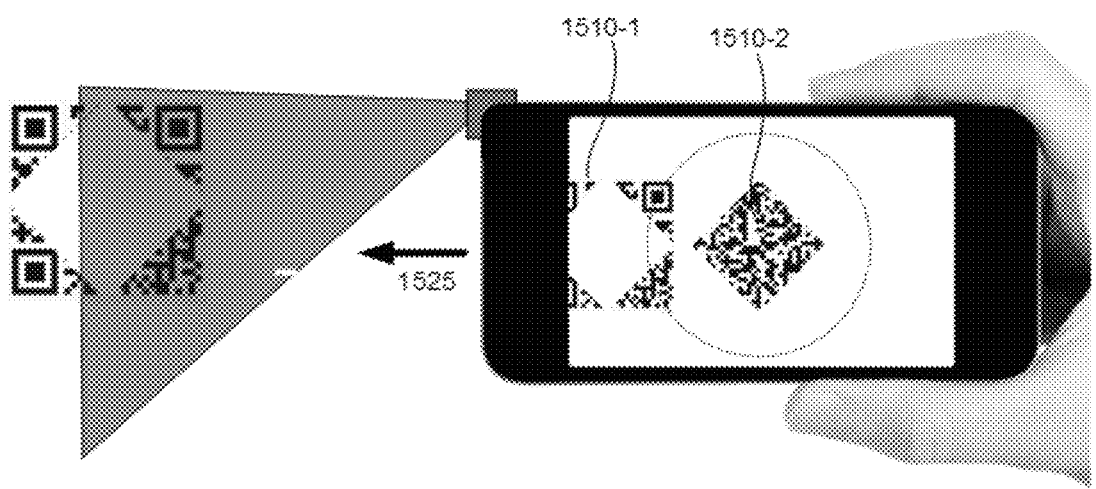
Figure 15H:
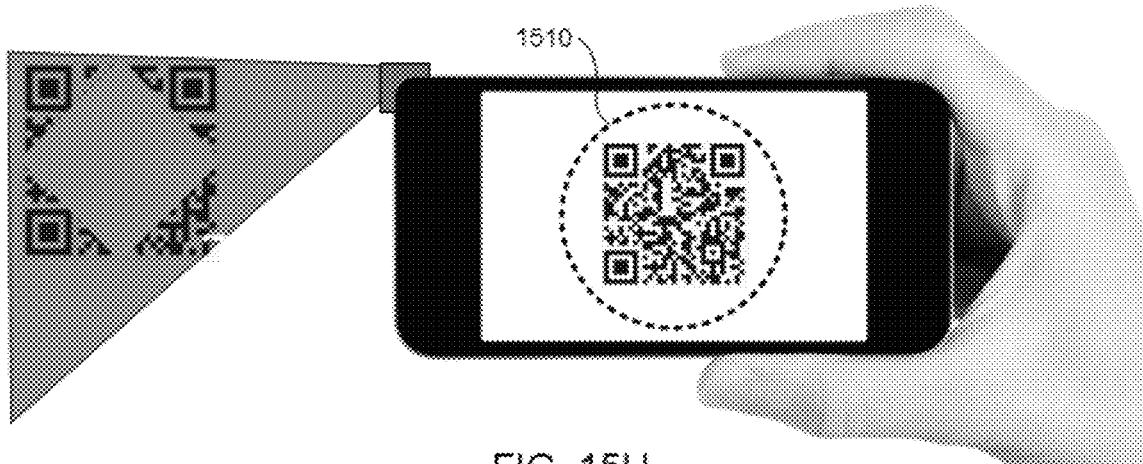

FIGS. 15F-15H schematically illustrate another hidden visual code that can be revealed by augmented reality.

Referring to FIG. 15F, the visual code 1510 may be deconstructed into the physical visual code 1510-1 (the first portion of the visual code) and the virtual visual code 1510-2 (the second portion of the visual code), as abovementioned. Referring to FIG. 15G, upon activation of the GUI 1504 of the device 1502 and/or authorization of the user to use the device 1502 (e.g., by fingerprint and/or retinal screening), the user may move the device 1502 towards the physical visual code 1510-1 (as indicated by the arrow 1525) while using the camera 1506 of the device 1502 to view the physical visual code 1510-1 in real time through the GUI 1504 of the device 1502. At the same time, the virtual visual code 1510-2 may be displayed to the user via the GUI 1504, thereby to allow the user to align the view of the physical visual code 1510-1 and the virtual visual code 1510-2 in real time in the augmented reality space shown in the GUI 1504. In some cases, the physical visual code 1510-1 and the virtual visual code 1510-2 may need to be aligned to a predetermined range of distance within the augmented reality to trigger a complete reconstruction of the visual code. Referring to FIG. 15H, the GUI 1504 shows the reconstructed form of the functional visual code 1510.

Figure 16A:
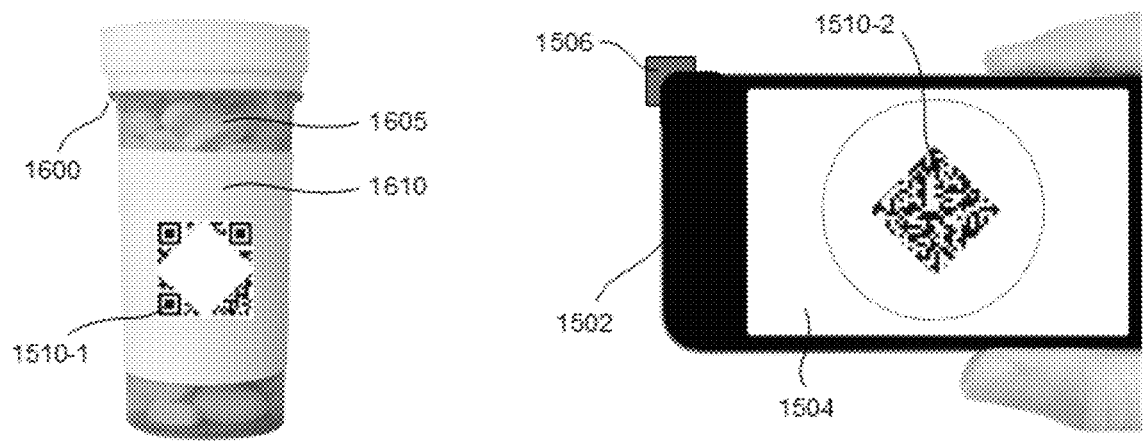
FIGS. 16A-16C schematically illustrate hidden visual code systems that can be revealed by augmented reality during medication pick-up.
Figure 16B:
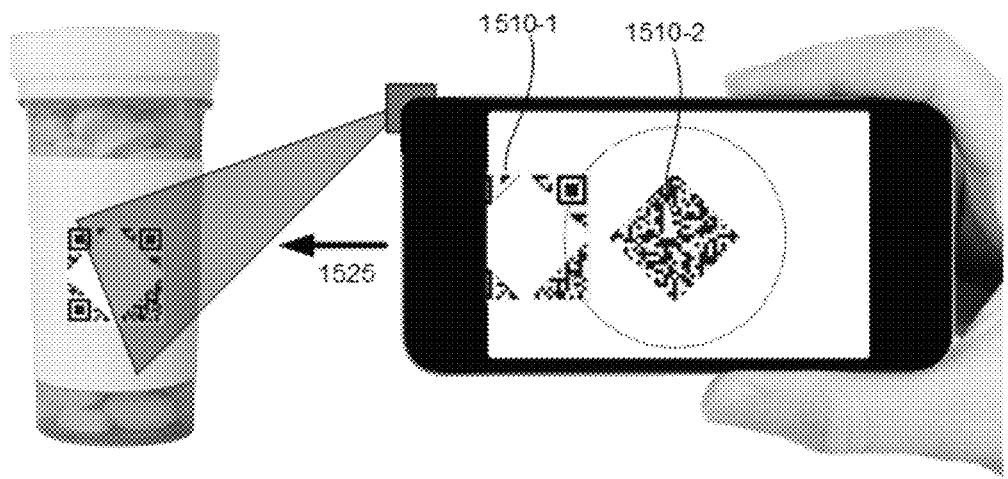
Figure 16C:
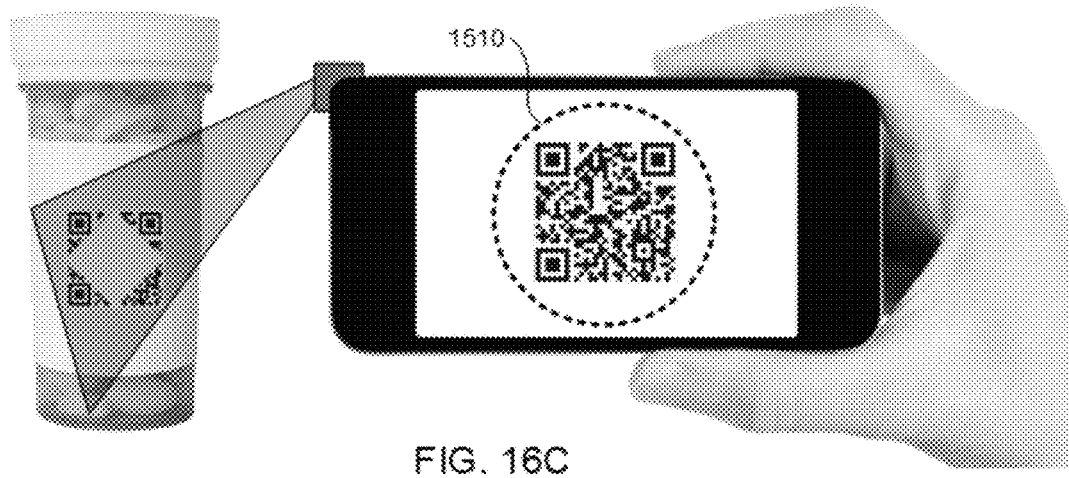

FIGS. 16A-16C schematically illustrate a hidden visual code that can be revealed by augmented reality for medication pick-up and/or drop-off. In an aspect, a reconstructable visual code may be used during the medication pick-up. In some cases, the reconstructable visual code may be used to verify identification of a user of a drug (or the user's proxy, e.g., a proxy for an immobile patient) and/or verify the drug assigned to the user (e.g., prescribed to the user by a healthcare practitioner such as a physician or a nurse practitioner, and/or purchased by the user at the store or remotely using one or more on-line purchasing services). In some cases, a visual code may be separated into a first portion and a second portion that may be configured to transform between two or more states. In a first state, the first portion and the second portion may be separated to form a nonfunctional visual code. The first portion and the second portion may be provided on a same object (or a same augmented reality environment) or different objects (or different augmented reality environment). In a second state, the first portion and the second portion may be combined to form a functional visual code. The functional visual code may be formed physically (e.g., on one or more physical objects) or in an augmented reality environment. In some cases, the first portion of the visual code may be provided by a pharmacy (or any other types of drug providers), and the second portion of the visual code may be provided by the user of the drug or the user's proxy.

The first portion of the visual code may be provided in an augmented reality environment associated with the pharmacy. The first portion may be stored and/or presented in a profile of the user (or the user's proxy) or the user's prescription record in a database associated with the pharmacy. The database associated with the pharmacy may be operatively in communication with the user's electronic medication administration record system (eMAR). In some cases, the healthcare practitioner may select an appropriate dose and/or duration time of taking or using the drug when prescribing the drug to the user. Subsequently, a computer processor operatively in communication with eMAR or the pharmacy's database may generate the first portion and the second portion of the visual code, and assign at least the first portion of the visual code to eMAR and/or the pharmacy's database. The first portion of the visual code may be accessible via the augmented reality environment associated with the pharmacy (e.g., a GUI of computer software used by the pharmacy). Alternatively or in addition to, the first portion of the visual code may be provided (e.g., printed) on a container (e.g., drug vial) or packaging (e.g., pharmacy bag, sleeve, box, etc.) configured to hold the drug that is assigned to the user (or the drug vial holding the drug). In such cases, the first portion of the visual code may be physically accessible.

The second portion of the visual code may be provided in an augmented reality environment associated with the user (or the user's proxy). In some cases, once the drug is prescribed to the user, the first portion and the second portion of the visual code may be generated (e.g., by eMAR), and the second portion may be provided to the augmented reality environment associated with the user (e.g., the user's profile in eMAR, pharmacy database, healthcare insurance database, etc.). In some cases, the augmented reality environment associated with the user may be operatively coupled to a personal device of the user of the user's proxy. Examples of the personal device may include a mobile device, such as, a smart phone, a smart watch, a tablet, smart glasses, etc. Alternatively or in addition to, the second portion of the visual code may be substantially identical to a user's specific code that is provided (e.g., printed) on an identifier (e.g., an identification card) of the user (or the user's proxy). Examples of the identification card may be a driver's license, passport, insurance card, hospital-issued identification card, pharmacy-issued identification card, etc. of the user or the user's proxy. In another alternative, the second portion of the visual code may be provided (e.g., printed on an object, such as the user's prescription paper) to the user by the healthcare practitioner when prescribing the medicine.

In some embodiments, the first portion of the visual code may be provided on an object (e.g., printed on a drug container's label), and the second portion of the visual code may be provided in augmented reality environment associated with the user (or the user's proxy). In some embodiments, the first portion of the visual code may be provided on an object (e.g., printed on a drug container's label), and the second portion of the visual code may be provided on an additional object (e.g., provided on a user identifier or the user's prescription paper). In some embodiments, the first portion of the visual code may be provided in augmented reality environment associated with the pharmacy, and the second portion of the visual code may be provided in augmented reality environment associated with the user (or the user's proxy). In some embodiments, the first portion of the visual code may be provided in augmented reality environment associated with the pharmacy, and the second portion of the visual code may be provided on an object (e.g., provided on a user identifier or the user's prescription paper).

In some cases, a scanner (e.g., a sensor, such as a camera) may be used to (i) scan one or both of the first portion and the second portion of the visual code, and (ii) form the functional visual code in an augmented reality environment associated with the scanner. In some examples, the scanner may be part of a pharmacy device. In some examples, the scanner may be part of the personal device of the user or the user's proxy. In an example, the scanner may be a camera of a mobile phone of the user or the user's proxy.

Referring to FIG. 16A, the first portion of the visual code may be printed on a drug vial 1600 that contains one or more prescription medicine 1605 (e.g., pills) for the user. The drug vial 1600 may comprise a label 1610, and the first portion 1510-1 of the visual code 1510 may be printed on the label 1610. The second portion 1510-2 of the visual code 1510 may be provided in augmented reality environment 1504 of a personal device 1502 of the user (e.g., GUI of the personal device 1502). Referring to FIG. 16B, upon activation of the augmented reality environment 1504 of the device 1502 and/or authorization of the user to use the device 1502 (e.g., by fingerprint and/or retinal screening), the user may move the device 1502 towards the first portion 1510-1 of the visual code (as indicated by the arrow 1525) while using one or more scanners (e.g., a camera 1506 of the device 1502 to view at least the first portion 1510-1 of the visual code in real time through the augmented reality environment 1504 of the device 1502). At the same time, the second portion 1510-2 of the visual code may be displayed to the user via the augmented reality environment 1504, thereby to allow the user to align the view of the first portion 1510-1 of the visual code and the second portion 1510-2 of the visual code in real time in the augmented reality environment 1504. In some cases, the first portion 1510-1 of the visual code and the second portion 1510-2 of the visual code may need to be aligned to a predetermined range of distance within the augmented reality environment to trigger a complete reconstruction of the visual code. Referring to FIG. 16C, the augmented reality environment 1504 may show the reconstructed form of the functional visual code 1510. Once the functional visual code 1510 is confirmed, the pharmacy may be allowed to transfer the drug to the user (or the user's proxy). Absent such confirmation of the functional visual code, the pharmacy may not be allowed to transfer the drug to the user. In some cases, when the visual code 1510 does not form a functional visual code specific for the user and the user's prescription, the pharmacy or the healthcare practitioner may be alerted.

Figure 17:
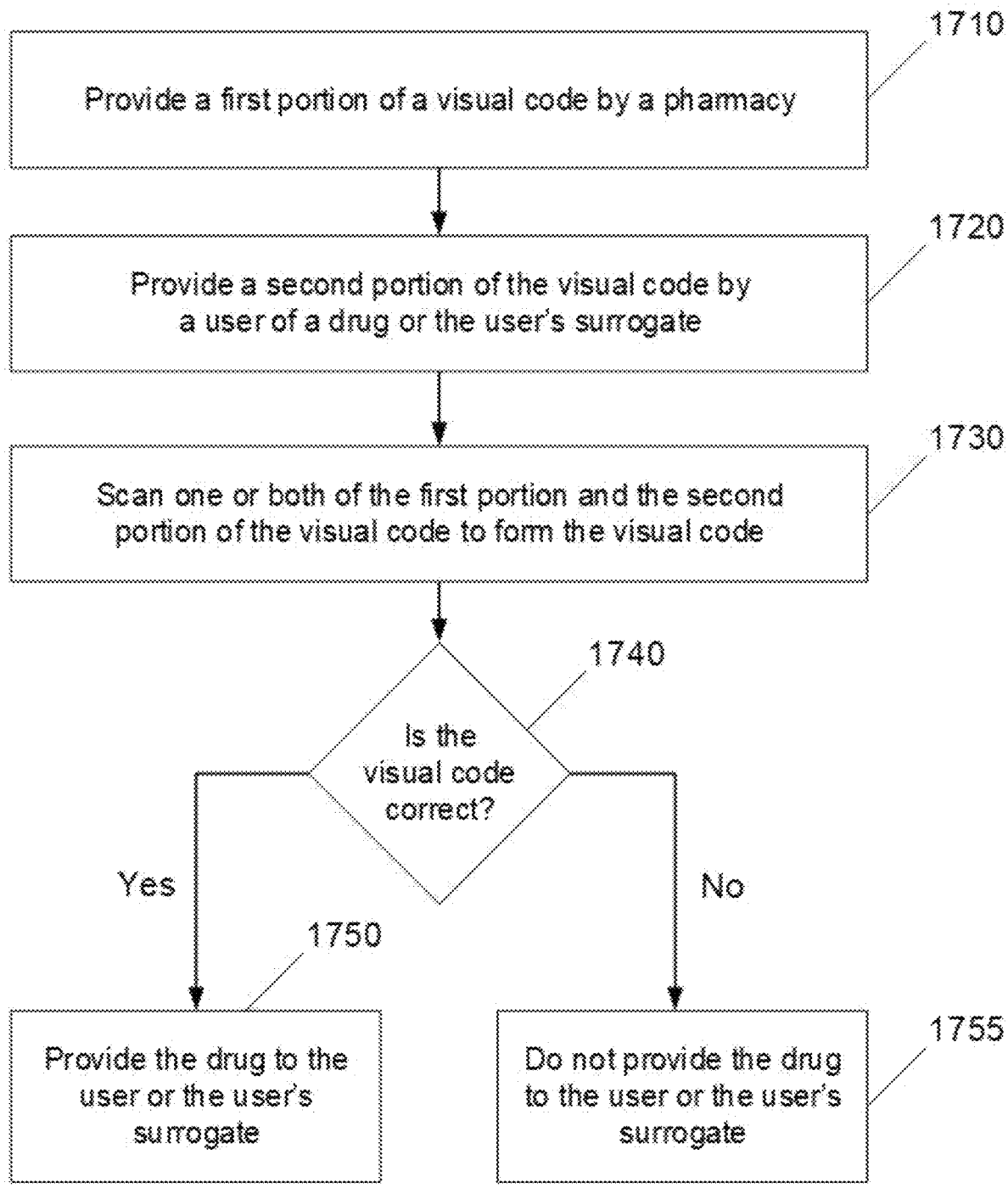
FIG. 17 schematically illustrates an example process of medication pick-up using a hidden visual code system.

FIG. 17 provides an example process of medication pick-up using a reconstructable visual code. A user of a drug (e.g., a prescription drug) or the user's proxy may arrive at a pharmacy. A first portion of a visual code may be provided by the pharmacy, e.g., in a first augmented reality environment associated with the pharmacy (process 1710). A second portion of the visual code may be provided the user or the user's proxy, e.g., in a second augmented reality environment associated with the user (process 1720). One or both of the first portion and the second portion of the visual code may be scanned (e.g., by the pharmacy using a scanner associated with the first augmented reality environment associated with the pharmacy) to form the visual code (process 1730). In an example, the visual code may be formed in the first augmented reality environment of the pharmacy. Following, the visual code comprising the first portion and the second portion may be verified, e.g., by a processor operatively coupled to the first augmented reality environment associated with the pharmacy (process 1740). If the visual code is confirmed to the correct ("YES"), the drug may be provided to the user or the user's proxy (process 1750). If the visual code is not confirmed to be correct ("NO"), the drug may not be provided to the user or the user's proxy.

In some embodiments, the first portion and/or the second portion of the visual code that is provided in an augmented reality environment may have a time limit, thereby requiring reconstruction of the first portion and the second portion into a functional visual code within a predetermined duration of time. Once past the predetermined duration of time, the first portion or the second portion of the visual code that exists in the augmented reality environment may expire and no longer be valid (e.g., may be changed permanently or may be deleted). The predetermined duration of time may be at least 5 minutes, 10 minutes, 20 minutes, 30 minutes, 40 minutes, 50 minutes, 60 minutes, 1.5 hours, 2 hours, 3 hours, 4 hours, 8 hours, 12 hours, 16 hours, 20 hours, 24 hours, 2 days, 3 days, 4 days, 5 days, 6 days, 1 week, 2 weeks, or more. The predetermined duration of time may be at most 2 weeks, 1 week, 6 days, 5 days, 4 days, 3 days, 2 days, 1.5 days, 24 hours, 20 hours, 16 hours, 12 hours, 8 hours, 4 hours, 3 hours, 2 hours, 1.5 hours, 60 minutes, 5 minutes, 40 minutes, 30 minutes, 20 minutes, 10 minutes, 5 minutes, or less. The predetermined duration of time may be determined by a healthcare practitioner (e.g., upon prescribing the drug to the user) or by the user (e.g., upon transferring the second portion of the visual code to the user's proxy).

In some embodiments, reconstruction of the first portion and the second portion of the visual code for user/drug verification may be used when the drug is being dropped off the user or the user's proxy.

In some embodiments, the drug may be provided in one or more of tablets, capsules, pills, powders, granules, dragees, gels, slurries, ointments, solutions suppositories, injections, inhalants, aerosols, transdermal patches, modifications thereof, or combinations thereof. In some embodiments, the drug may be provided in one or more of the tablets, capsules, or pills. In some embodiments, the unused medication(s) are provided in one or more of the transdermal patches.

In some embodiments, the drug may or may not require prescription (e.g., by healthcare providers). In some examples, prescriptions may not be needed for over-the-counter medications, such as, for example, Robitussin, Tylenol, and Sudafed. The medications, as provided herein, may or may not be controlled. Examples of non-controlled substances include antibiotics, cholesterol medication, and Viagra. Examples of controlled substances can comprise opiate and opioids, as well as central nervous system (CNS) depressants and stimulants. Examples of opioids can include morphine, codeine, thebaine, oripavine, morphine dipropionate, morphine dinicotinate, dihydrocodeine, buprenorphine, etorphine, hydrocodone, hydromorphone, oxycodone, oxymorphone, fentanyl, alpha-methylfentanyl, alfentanyl, trefantinil, brifentanil, remifentanil, octfentanil, sufentanil, carfentanyl, meperidine, prodine, promedol, propoxyphene, dextropropoxyphene, methadone, diphenoxylate, dezocine, pentazocine, phenazocine, butorphanol, nalbuphine, levorphanol, levomethorphan, tramadol, tapentadol, anileridine, any functional variant thereof, or any functional combinations thereof. Examples of CNS depressants and stimulants can include methylphenobarbital, pentobarbital, diazepam, clonazepam, chlordiazepoxide, alprazolam, triazolam, estazolam, any functional variant thereof, or any functional combinations thereof.

Additional examples of the medications and the relevant therapeutic applications include scopolamine for motion sickness, nitroglycerin for angina, clonidine for hypertension, and estradiol for female hormone replacement therapy. Other examples of the drug include, but are not limited to, methylphenidate, selegiline, rivastigmine, rotigotine, granisteron, buprenorphine, oestrodiol, fentanyl, nicotine, testosterone, etc.

In one aspect of the present disclosure, a reconstructable visual code (RVC) may comprise an augmented reality code (ARC) and a physical code (PHC). Combination of the ARC and the PHC of the RVC may form a functional visual code (e.g., a digital code, such as a QR code). The ARC may be provided in an augmented reality environment and visualized on a digital display, and the PHC may be on a physical object provided (e.g., printed or presented on a digital display). Examples of such digital display may include, but are not limited to, liquid crystal displays (LCD), light emitting diode (LED) displays, quantum dot (QD) displays, electronic ink (e-ink) displays, etc. The ARC and/or the PHC may be permanent or static. Alternatively, the ARC and/or the PHC may be updated at least once during its lifetime. In some cases, a user may manually update the ARC and/or the PHC (e.g., via a GUI operatively coupled to the ARC and/or the PHC). In some cases, the ARC and/or the PHC may be updated dynamically (i.e., ARC-D, PHC-D) by a code generator, e.g., updated once every 10 minutes, 20 minutes, 30 minutes, 40 minutes, 50 minutes, 60 minutes, 1.5 hours, 2 hours, 3 hours, 4 hours, 5 hours, 6 hours, 12 hours, 24 hours, 2 days, 3 days, 4 days, 5 days, 6 days, 7 days, 2 weeks, 3 weeks, 4 weeks, 2 months, 3 months, or more. Alternatively, the ARC and/or the PHC may be updated at one or more random and irregular times. The ARC and/or the PHC may be updated (manually or dynamically) at least 1, 2, 3, 4, 5, 6, 7, 8, 9, 10, 15, 20, or more times. The ARC and/or the PHC may be updated (manually or dynamically) at most 20, 15, 10, 9, 8, 7, 6, 5, 4, 3, 2, or 1 time.

In some embodiments, the user of the RVC system (e.g., one who combines a PHC and an ARC in an augmented reality environment to form a functional visual code) of the present disclosure may be incentivized. Examples of an incentive may include membership status upgrade (e.g., for additional or improved membership services) or monetary incentives (e.g., cash, merchandize credit, discounts, etc.).

In some embodiments, the RVC of the present disclosure may be useful for security systems methods. The combination of the ARC and the PHC of the RVC into the functional visual code may be necessary to verify identification of a user, an object of transaction, and/or a time of such transaction. In some cases, the RVC may be used in a two-factor authentication process. In place of a user's standard password and a temporary password (e.g., a temporary personal identification number (PIN) number provided to the user's personal device or a security key fob), one of the ARC and the PHC may be used as the user's standard password, and the other of the ARC and the PHC may be used as the temporary password. The ARC and the PHC may not be programmed with a timer, in which case both the ARC and the PHC may be valid at least until combined to form the functional visual code. Alternatively, the ARC and the PHC may be programmed with a time limit (e.g., a digital timer), such that the functional visual code may be formed only if the ARC and the PHC are combined within a predetermined duration of time or within a predetermined time window. When the predetermined duration of time is lapsed, or it is outside of the predetermined time window, a new version of the ARC and/or the PHC may be generated, and their previous version(s) may become invalid. The predetermined duration of time may be at least 5 minutes, 10 minutes, 20 minutes, 30 minutes, 40 minutes, 50 minutes, 60 minutes, 1.5 hours, 2 hours, 3 hours, 4 hours, 8 hours, 12 hours, 16 hours, 20 hours, 24 hours, 2 days, 3 days, 4 days, 5 days, 6 days, 1 week, 2 weeks, or more. The predetermined duration of time may be at most 2 weeks, 1 week, 6 days, 5 days, 4 days, 3 days, 2 days, 1.5 days, 24 hours, 20 hours, 16 hours, 12 hours, 8 hours, 4 hours, 3 hours, 2 hours, 1.5 hours, 60 minutes, 5 minutes, 40 minutes, 30 minutes, 20 minutes, 10 minutes, 5 minutes, or less. The predetermined time window may be a specific time window of the day, a specific day of the week, a specific week of the month, a specific month of the year, and/or a specific year.

In some embodiments, the RVC of the present disclosure may be used for point of entry security systems and methods. The point of entry systems and methods may be used, for example, to control and/or track a user's access, entering, or exiting from a site of interest, such as a campus, facility, building, office, apartment, house, dorm, hotel room, locker room, etc. In some cases, a locking system at an entry point of the site of interest may exhibit a PHC (e.g., on a display operatively coupled to the locking system). The user may approach the entry point of the site of interest and activate the ARC on the user's personal device (e.g., a mobile device such as a smart phone or smart watch). The ARC may be displayed or "floating" in an augmented reality environment of the personal device (e.g., within a GUI of the personal device). The augmented reality environment may be operatively linked to a sensor (e.g., a scanner, a camera, etc.) of the user's personal device, such that the ARC may be displayed to the user (e.g., via a GUI of the sensor of the personal device) as the user attempts to visualize and capture a picture/image/video of the PHC by using the sensor. In such cases, both the ARC and the PHC may be displayed in the augmented reality environment, thereby allowing the user to combine them and form the functional visual code. Formation (or verification, e.g., by a processor operatively coupled to the augmented reality environment) of the functional visual code comprising the ARC and the PHC may indicate confirmation of the user's identification. The user may be granted access or exit through the point of entry only when the functional visual code is formed (or verified).

In some cases, the ARC and the PHC may be static. The ARC and the PHC may not be changed from at least when the ARC or the PHC is assigned to the user, and until when the ARC and the PHC are combined to form the functional visual code. In some cases, the ARC and/or the PHC may be changing, e.g., dynamically changing. In an example, the user's personal device may be a code generator. A processor operatively coupled to the user's personal device (e.g., an application installed on the user's personal device) may generate a recurring and unique ARC to match with the PHC when the user tries to access the locking system at the entry point of the site of interest.

In some embodiments, the RVC of the present disclosure may be used for one or more ride share services. Examples of the ride share services may include, but are not limited to, car share services (e.g., Uber, Lyft, Turo, Zipcar, Zipvan, Enterprise CarShare, Getaround, Car2Go, Curb Mobility, Zimride, Flywheel, HourCar, Hui, Juno, Maven, etc.), bicycle share services (e.g., Capital Bikeshare, Divvy, Citi Bike, BIXI, Nice Ride Minnesota, Discover Bike, Hubway, Denver B-Cycle, Bike Chattanooga, etc.), and scooter share services (Bird, Bolt, gruv, JUMP, Lime, Lyft, Sherpa, Spin, VeoRide, Wheels, etc.). In some cases, the PHC may be displayed on the ride to be shared. In some examples, the PHC may be displayed on the car (e.g., displayed by the window or the handle of the car door, on or next to a seat of the car, etc.) or displayed on an electronic device of the deriver (e.g., displayed on a smart phone of the driver). In some examples, the PHC may be printed on the bike or the scooter, or displayed on an electronic screen of the bike of the scooter. The ARC may be displayed in an augmented reality environment associated with a personal device (e.g., a smart phone) of the user of the ride share. Matching of the ARC and the PHC to form the functional visual code (e.g., in the augmented reality environment of the user's smart phone) may permit access, entrance, or use of the ride sharing system.

In some embodiments, the RVC of the present disclosure may be used for delivery services (e.g., Amazon, Walmart, Target, USPS, UPS, FedEx, etc.), e.g., package delivery services. Other examples may include grocery delivery services (e.g., Amazon Fresh, Fresh Direct, Instacart, Google Express, Foodkick, Peapod, Jet, Postmates, Max Delivery, etc.) and food delivery services (e.g., GrubHub, Seamless, DoorDash, Uber Eats, Caviar, Postmates, etc.). In some cases, receiver verification may be required for the delivery service to drop off the package to the recipient. In some examples, the PHC may be printed on the package (e.g., on a shipping label of the package), and the recipient may need to provide the ARC (e.g., on a GUI application on the recipient's personal device) to form the functional visual code and verify the recipient's identity or the delivery address. Alternatively, the PHC may be provided by the recipient (e.g., on a GUI application on the recipient's personal device), and the ARC may be provided by the delivery service provider (e.g., on a GUI application on the the delivery service provider's electronic device). The delivery service provider may use the electronic device to scan the PHC, such that the PHC and the ARC may be combined in the augmented reality space to form the functional visual code. The delivery service provider may drop off the package only upon verification of the newly formed functional visual code.

In some cases, the PHC may be provided inside the delivery package for verification or tracking of the package by the provider of the package. In some examples, the PHC may be printed on or adjacent to the product being delivered inside the package. Alternatively, the PHC may be printed on a receipt or a separate document that is provided inside the package. After receiving the package, the recipient may open the package and locate the PHC inside the package. Following, the user may use the user's personal device to capture the PHC onto the augmented reality space associated with the user's personal device, thereby to combine the PHC and the ARC in the augmented reality environment and form the functional visual code. Formation and verification of such functional visual code may inform the provider of the product that the product was delivered and/or that an intended recipient received the product. To track and/or verify the identity of the recipient, the personal device of the recipient may be pre-registered to a database of the provider of the product.

Figure 18:
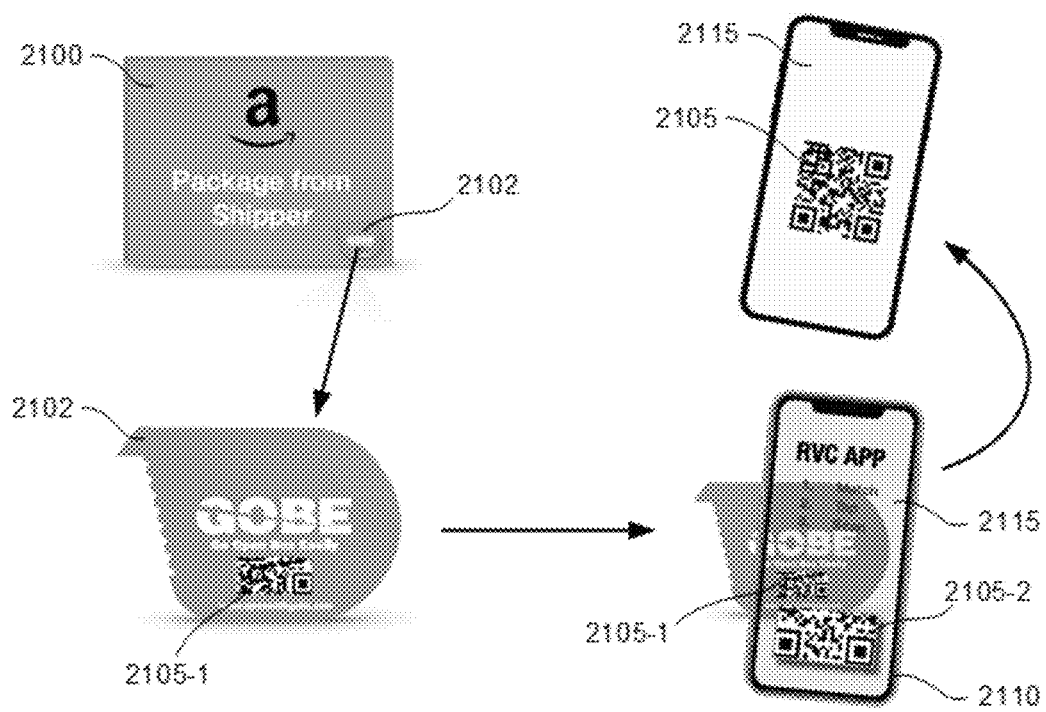
FIG. 18 schematically illustrates an example of tracking a package delivery by using a reconstructable visual code system.

FIG. 18 schematically illustrates an example of tracking a package delivery by using the RVC system of the present disclosure. A provider may deliver one or more items to a recipient by using a package delivery service. The item(s) may be packaged in a box 2100 for shipping. On an outer service and/or inside the box 2100, the provider may include a tracking label 2102. The tracking label 2102 may be the same or different from a shipping label used by the package delivery service. A PHC 2105-1 may be provided (e.g., printed) on the tracking label 2102. Once the recipient receives the box 2100 and confirms the item(s) inside the box 2100, the recipient may locate the tracking label 2102. Using a personal device 2110 (e.g., a smart phone), the recipient may turn on a GUI 2115 (e.g., an application) that is operatively in communication with the provider or the provider's database. The GUI 2115 may display on the personal device 2110 an augmented reality environment that includes an ARC 2105-2 that is compatible with the PHC 2105-1. The recipient may move the personal device 2110 over the PHC 2105-1 and scan the PHC 2105-1 until a digital image or video of the PHC 2105-1 is combined with the ARC 2105-2 in the augmented reality environment of the GUI 2115 to form a functional visual code 2105. Formation of the functional visual code 2105 may send a signal (e.g., an alert message) to the provider or the provider's database, indicating that the item(s) have been delivered to recipient. In some cases, such system and method of package delivery confirmation via the recipient may be more accurate than confirmation by the package delivery service. In some cases, once the functional visual code is formed and verified, the recipient may be incentivized for completing scanning of the RVC.

In some embodiments, the RVC of the present disclosure may be used for self-service delivery. Examples of the self-service delivery may include parcel delivery (e.g., Amazon Locker, UPS Access Point, Box 24, etc.), grocery delivery, laundry drop-off and pick-up, etc. Conventionally, one or more items may be stored at a designated locker of a self-service locker station, instead of being delivered directly to a recipient. Following, the recipient would be required to go to the self-service locker station, provide a code (e.g., a code provided by the self-service delivery provider) to a GUI of the self-service locker station to open the designated locker, and retrieve the item(s). In contrast, the self-service locker may utilize the RVC of the present disclosure to confirm identity of the recipient in place of the code. For example, when the item(s) are assigned to a designated locker, a PHC and its compatible ARC may be generated. The PHC may be sent to a database associated with the self-service locker station, while the ARC may be provided to the user, e.g., transmitted to an augmented reality environment associated with the user's personal device. When picking up the item(s), the PHC may be provided by the self-service locker station (e.g., displayed on its electronic display), and the recipient may capture an image/video of the PHC, combine the PHC with the ARC in the augmented reality environment associated with the user's personal device, and generate the functional visual code. The recipient's personal device may be operatively coupled to the self-service locker station, such that formation and/or verification of the functional visual code in the augmented reality environment triggers the self-service locker station to open the designate locker, thereby allowing the recipient to retrieve the item(s). Alternatively, the PHC may be provided by the recipient, while the ARC may be provided by an augmented reality environment associated with the self-service locker station.

In some embodiments, the RVC of the present disclosure may be used for item pick-up or retrieval. In some cases, the RVC of the present disclosure may be used for luggage retrieval. For example, upon checking in a luggage, a specific luggage tag may be generated for the luggage, and the PHC may be printed on the luggage tag. At the same time, an ARC that is complementary to the PHC of the luggage tag may be generated and provided to the user, e.g., transmitted to an augmented reality environment associated with the user's personal device. Once the luggage is landed at a destination and transferred to a luggage pick-up site (e.g., a baggage carousel at the airport), the owner of the luggage may be required to identify the luggage, scan the PHC of the luggage tag using the user's personal device, and combine the PHC and the ARC to form a functional visual code in the augmented reality environment. Such augmented reality environment of the user's personal device may be operatively in communication with a database of airlines or luggage courier services, such that the airlines or the luggage courier services may track and ensure that the luggage is retrieved by the owner. In some examples, the airlines may be able to track when an incompatible PHC is scanned by one or more passengers. In some examples, the airlines may be able to identify when a PHC of a luggage was not scanned to form a functional visual code within a predetermined duration of time, e.g., one hour after the luggage has arrived at the destination or the luggage pick-up site (which may indicate the luggage was not picked up). In such cases, the airlines may send an alert to a local staff at the airport and/or to the personal device of the owner of the luggage.

Figure 19:
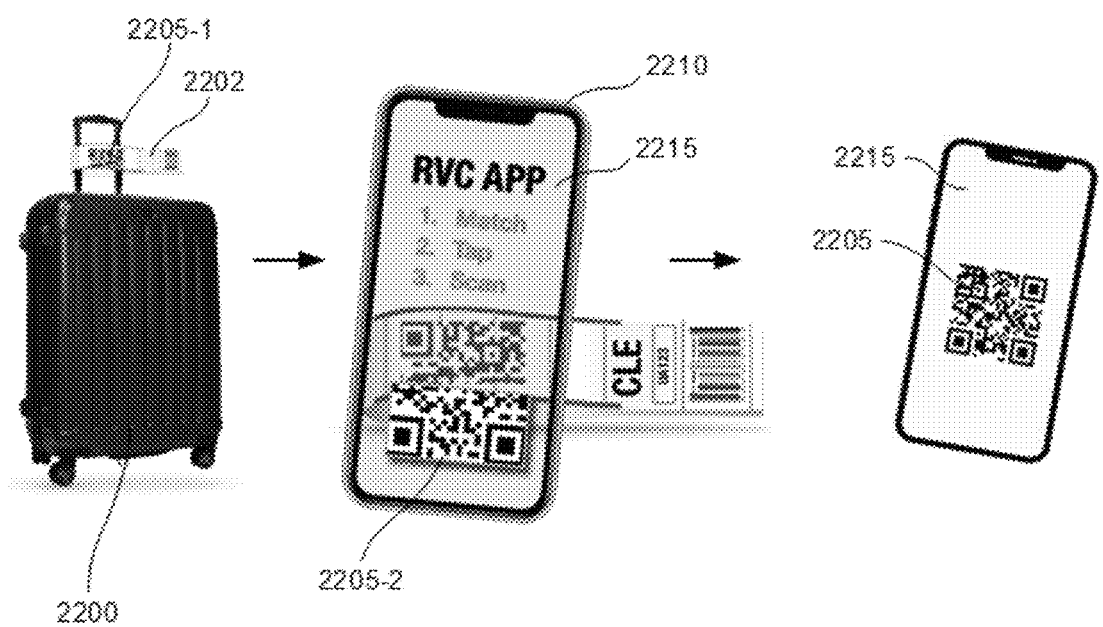
FIG. 19 schematically illustrates an example of luggage retrieval by using a reconstructable visual code system.

FIG. 19 schematically illustrates an example of luggage retrieval by using the RVC system of the present disclosure. A checked luggage 2200 may be marked with a tag 2202. The tag 2202 may comprise a PHC 2205-1, and an ARC 2205-2 that is complementary to the PHC 2205-1 may be provided to the user, e.g., transmitted to an augmented reality environment 2215 (e.g., in a GUI of an application) associated with the user's personal device 2210. During luggage/baggage claim, an owner of the luggage 2200 may locate the luggage 2200 (e.g., a baggage carousel at the airport), move the personal device 2210 over the tag 2202, and scan the PHC 2205-1 until a digital image or video of the PHC 2205-1 is combined with the ARC 2205-2 in the augmented reality environment 2215 to form a functional visual code 2205. Formation of the functional visual code 2205 may send a signal to the airline or luggage courser services' database, indicating that the luggage 2200 has been retrieved by the owner.

In some embodiments, a reconstructable visual code (RVC) comprising an augmented reality code (ARC) and a physical code (PHC) may be used for gamification (e.g., events such as contests, lotteries, etc.) to attract one or more users and/or maintain engagement (e.g., brand loyalty) of the one or more users over time. The gamification using the RVC may be provided on-line (e.g., via web-based interfaces) and/or physical events.

In some cases, the gamification may be a hidden treasure contest. A provider (e.g., a retailer, a restaurant, a professional sports team, etc.) may provide a PHC of the RVC along with a product to be sold or distributed to one or more customers. In an example, the product may be a candy, and the PHC may be provided inside a candy wrapper. The one or more users may have GUI application associated with the provider on their personal device (e.g., a smart phone). The one or more users may be provided with a unique that could be combined (e.g., in an augmented reality environment of the GUI application) to form a functional visual code. In some examples, the one or more users may receive/purchase a product and form the functional visual code, and generate a predetermined number (or the highest number) may result in winning the hidden treasure contest. In some examples, a particular "winning" PHC may be generated and provided with one of the products, and a user who generates a functional visual code by combining the winning PHC with his or her ARC may win the prize/contest. In some cases, one or more winners may receive an "online" award via the GUI application and/or a physical award (e.g., products, gift cards, etc.). Additionally, other users of the GUI application of the provider may be alerted with announcement about the one or more winners. The provider may further post to one or more social media platforms (e.g., Facebook, Instagram, Twitter, provider's website, etc.) to announce the one or more winners and gain further attraction of new users. In some cases, the PHC may not be provided to the users with a purchased or distributed product (e.g., a real-life object), but rather be provided to the user via a GUI application associated with the provide or via one or more electronic messages (e.g., texts, emails, etc.) to the users. In an example, a provider may request a user's personal information (e.g., phone number, e-mail address, access to the user's online data, such as cookie data, etc.) and provide a PHC as an incentive. In such a case, the PHC can be provided to one or more users without requiring the one or more users to purchase any products, goods, or services.

In some cases, the gamification may be a lottery contest. In some examples, each ticket to the lottery may include a PHC. Such ticket may be purchased by the users or be distributed to the user (e.g., for free or along with other purchased products, goods, or services). Once received, the users may use their personal device, and use an ARC in an GUI application on their personal device to combine the PHC and the ARC into a functional visual code. Once generated, each functional visual code and the respective user's information may be retrieved by a database associated with a provider of the lottery contest. After a set time (e.g., weekly, biweekly, monthly, yearly, etc.), one or more functional visual codes may be chosen (e.g., randomly) to select one or more winners of the lottery contest.

In some cases, the gamification may include or incorporate advertisements. Advertisements, such as, for example, billboards, magazine ads, social media posts, online display ads, etc., can display the PHC. The PHC may be compatible with a plurality of ARCs, and each of the plurality ARCs may be provided to a user. The user can download a GUI application associated with the advertisement on the user's personal device, and the user's unique ARC may be provided via the GUI application. Using the user's personal device and the GUI application, the user may capture an image (e.g., a "selfie") and/or a video of the ARC to combine the PHC and the ARC and generate a functional visual code. In some examples, taking the image/video may be performed manually by the user. Alternatively, the GUI application may be programmed such that the picture/video is only captured when (i) the ARC of the user is superimposed on or adjacent to the PHC on the ad and (ii) the functional visual code is generated. In some examples, the GUI application may be programmed to automatically transmit the picture/video to a database associated with the advertisement. The database may or may not share the picture/video in one or more social media platforms associate with the advertisement. Alternatively or in addition to, the user may be required to post the picture/video to one or more social media platforms associated with the advertisement and/or associated with the user. In the latter case, the user may be required to provide a metadata tag (e.g., a hashtag) associated with the advertisement, which would allow one or more of the "tagged" image/video to be uploaded (e.g., automatically uploaded) to a database associate with the advertisement and the metadata tag. One of more winners of the event may be selected from the image/video that includes the functional visual code. In some examples, the one or more winners may be selected randomly. In some examples, the one or more winners may be selected based on one or more criteria, e.g., content of the image/video, the user's description of the image/video, etc. In an example, a user may access the user's ARC via a GUI application on the user's mobile phone. The user may use the GUI Application to take a selfie while, at the same time, trying to combine the ARC and a virtual copy of the PHC of the billboard in the augmented reality of the GUI application. An image or video of the user and the billboard may be captured and stored only when a functional visual code is generated from the ARC and the PHC. In another example, the advertisement may be associated with a new song by an artist. The advertisement may ask the participants to post a picture/video (which includes a functional visual code, as abovementioned) to the one or more social media platforms along with a cover (e.g., a karaoke cover) of the new song. A winner may be selected based on each user's performance in the cover. A provider of products, goods, and/or services may utilize advertisements using the RVC system to foster user engagement, user competition, and/or user creativity, and enhance brand value of the provider through interactions with its users, customers, followers, etc.

Live events such as, for example, festivals (e.g., Burning Man, Coachella, Lollapalooza, etc.), concerts, sport games, etc., can also utilize advertisements that incorporate the RVC system of the present disclosure. The PHC (e.g., a static PHC or a PHC-D) may be displayed in one or more electronic display screens at a live event. When the live event is broadcasted (e.g., to a television or a mobile device), the one or more electronic display screens may be broadcasted. Alternatively or in addition to, a separate advertisement (e.g., a TV ad) may be transmitted to provide the same PHC. As abovementioned, participants may use their personal devices to combine their unique ARC with the PHC (e.g., in an augmented reality environment of a GUI application) to generate a functional visual code, and each generated functional visual code and the respective participant's profile information may be provided to a database associated with the advertisement (e.g., a database associated with a sponsor of the advertisement). Upon selection of one or more winners, the name and/or image of the winner(s) (upon consent) may be exhibited on the electronic display screens) at the live event, in real time.

In some embodiments, the RVC of the present disclosure may be used in providing product information to a user. In some cases, a packaging of one or more products (e.g., gift cards, electronic devices, groceries, clothes, etc.) may be printed with a PHC. In some examples, the PHC may be provided on a tag (e.g., a metal tag, sewn-on label, sticker, etc.) that is coupled to the one or more products. In some examples, the PHC may be printed directly on the one or more products. When shopping, the user may use his or her personal device (e.g., a smart phone) and its GUI application to capture an image/video of the PHC. The captured PHC may be combined with the user's ARC, in an augmented reality environment of the GUI application, to generate a functional visual code. By generating the functional visual code, the user may have access to information about the product and/or discounts (or coupons) for the product. In some cases, the coupons may only be accessible by generating the functional visual code. By engaging the user to interact with the RVC, the store that sells the product and/or an original provider of the product may receive information about the user (e.g., phone number, e-mail address, access to the user's online data, such as cookie data, etc.).

Blockchain

The database of the present disclosure to store one or more portions of a resonstructable visual code (e.g., for user/medication verification during medication pick-up; a PHC, an ARC, and/or a reconstructed functional visual code thereof; etc.) can comprise or utilize a block chain (or "blockchain") database. The term "blockchain," as used herein, can refer to a suite of distributed ledger technologies that can be programmed to record and track anything of value (e.g., financial transactions, land titles, medical records, etc.). The blockchain can be a peer-to-peer (P2P) decentralized open ledger (or computer architecture thereof) that relies on a distributed network shared among its users. Each of the users can hold a public ledger of every transaction carried out using the architecture, and each public ledger can be checked against one another to ensure accuracy and accountability. Thus, a blockchain-based database (or blockchain database) can be used in place of a physical, centralized database, to record and handle one or more transactions of digital objects (e.g., data). Maintenance of the blockchain can be performed by a P2P network of communicating nodes (or computer systems) that are running a software. The software can be programmed with a specific application (e.g., cryptocurrency software, financial services software, supply chain software, smart contracts software, etc.). Transactions such as "party X transfers an object (e.g., a digital object, such as, for example, cryptocurrency, prescriptions, etc.) Y to party Z" can be broadcasted to the P2P network (e.g., by using one or more software applications). The network nodes can validate the transactions, add them to their copy of the ledger, and then broadcast these ledger additions to other nodes. Thus, the blockchain can be a distributed database, wherein, in order to independently verify the chain of ownership or validity of any and every transferred object, each network node stores its own copy of the blockchain. In some cases, a new group of transactions (i.e., a block) is created (e.g., at a predetermined frequency, such as, for example, 6 times per hour), added to the blockchain, and quickly published to all nodes in the P2P network. Thus, each block can contain a cryptographic hash of the previous block to keep the previous block "accountable."

Tampering with transactions on the blockchain can become exponentially harder as time progresses, and can require extreme quantities of computing power to attempt, let alone succeed. In some cases, data stored in the blockchain can be included in integrity checks, in which transactions are assembled into a transaction merkle tree and hashed to produce a block header. Any alterations to transactions in a blockchain database can become apparent as the block would be invalid when indexed. As such, the blockchain's consensus mechanism can allow a data's hash to be published to the blockchain as irrefutable proof that the data existed at a given time in the past. Both the timestamp and the hash may be unalterable.

In some embodiments, for medication pick-up, scanning at least one or both of the first portion and the second portion of the visual code may be updated to the blockchain database for verification of the visual code and/or closed loop tracking of such medication, e.g., to track (i) production, supply, use, and retrieval of the medication, (ii) personal linking (e.g., recording identification of practitioner(s) responsible for application and/or removal of the medication), (iii) user or patient linking, and/or (iv) pharmacy tracking (e.g., distributing the covering, receiving the device containing the covering. In an example, the blockchain database may provide a record (e.g., a permanent or irrefutable record) of each transaction as the medication is moved along the supply chain, to a hospital (e.g., in an ADM), and to a user (e.g., a patient) or the user's proxy. The blockchain database, as provided herein, can be an alterable and secured P2P network among patients, prescribers, pharmacy, government agencies (e.g., FDA, DEA, etc.), medication manufacturer, etc., to record and transfer data (e.g., medical history, prescription history, date of prescription, date of medication pick-up, etc.).

In some embodiments of the present disclosure, the functional visual code that is generated by combining the PHC and the ARC (e.g., in an augmented reality environment associated with a user) may be updated to the blockchain database, along with the user's information (e.g., phone number, e-mail address, access to the user's online data, such as cookie data, etc.), for verification of the visual code and tracking of the user. In an example, the blockchain database may provide a record (e.g., a permanent or irrefutable record) of the functional visual code, such as a location, date, time, or user associated with generation of the functional visual code. The blockchain database, as provided herein, can be an alterable and secured P2P network, for example, among (i) providers of products, goods, services, and events associated with the RVC, (ii) stores that sell such products/goods, and (iii) customers of the products/goods, users of the services, and/or participants of the events.

Computer System

Figure 13:
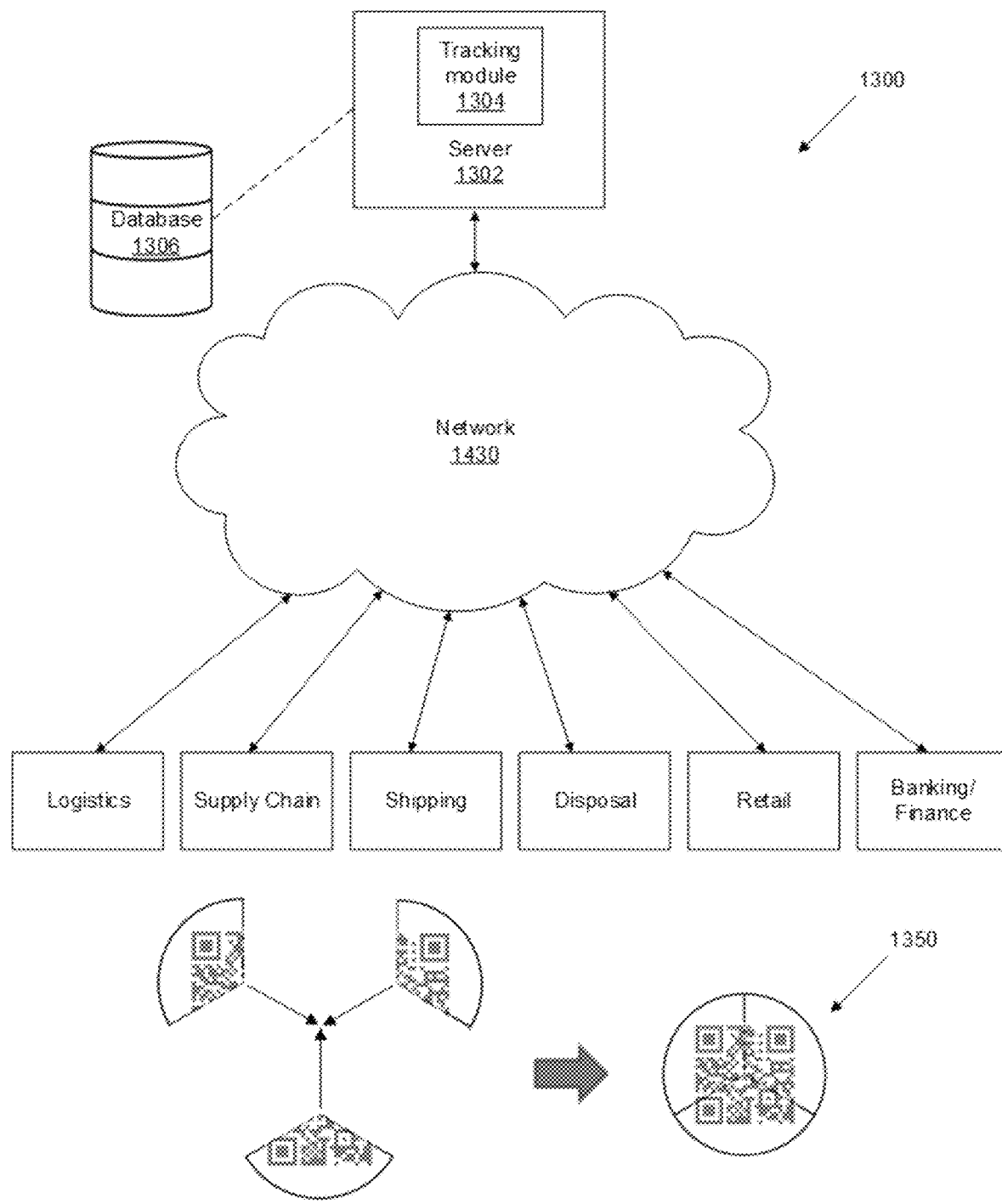
FIG. 13 schematically illustrates an ecosystem for use of the reconstructable visual code.

FIG. 13 illustrates an ecosystem 1300 in accordance with some embodiments. The ecosystem 1300 can include a server 1302. The server 1302 can be in communication with a network 1430. The network 1430 can be in operative communication with operative functions of multiple applications, e.g., logistics, supply chain, shipping, disposal (e.g., trash disposal, controlled substance disposal), retail, banking/finance, etc. Each of the operative functions of the multiple applications can be in communication with one or more visual scanning systems. The visual scanning system(s) can be configured to take an image and/or video of reconstructed and non-reconstructed visual codes (e.g., a reconstructed visual code 1350) from one or more articles of interest (e.g., documents, objects, animals, individuals, etc.). The server 1302 can include a tracking module 1304 configured to analyze the image and/or video of reconstructed visual codes. The tracking module 1304 may further be configured to track, monitor, and/or log the article(s) based on a sequential scan of the respective reconstructable visual codes over time. Additionally, the server 1302 can be in communication with a database 1306 to store images and/or videos of the reconstructed and non-reconstructed visual codes of the article(s), as well as analysis of the images and/or videos by the tracking module 1304.

Figure 14:
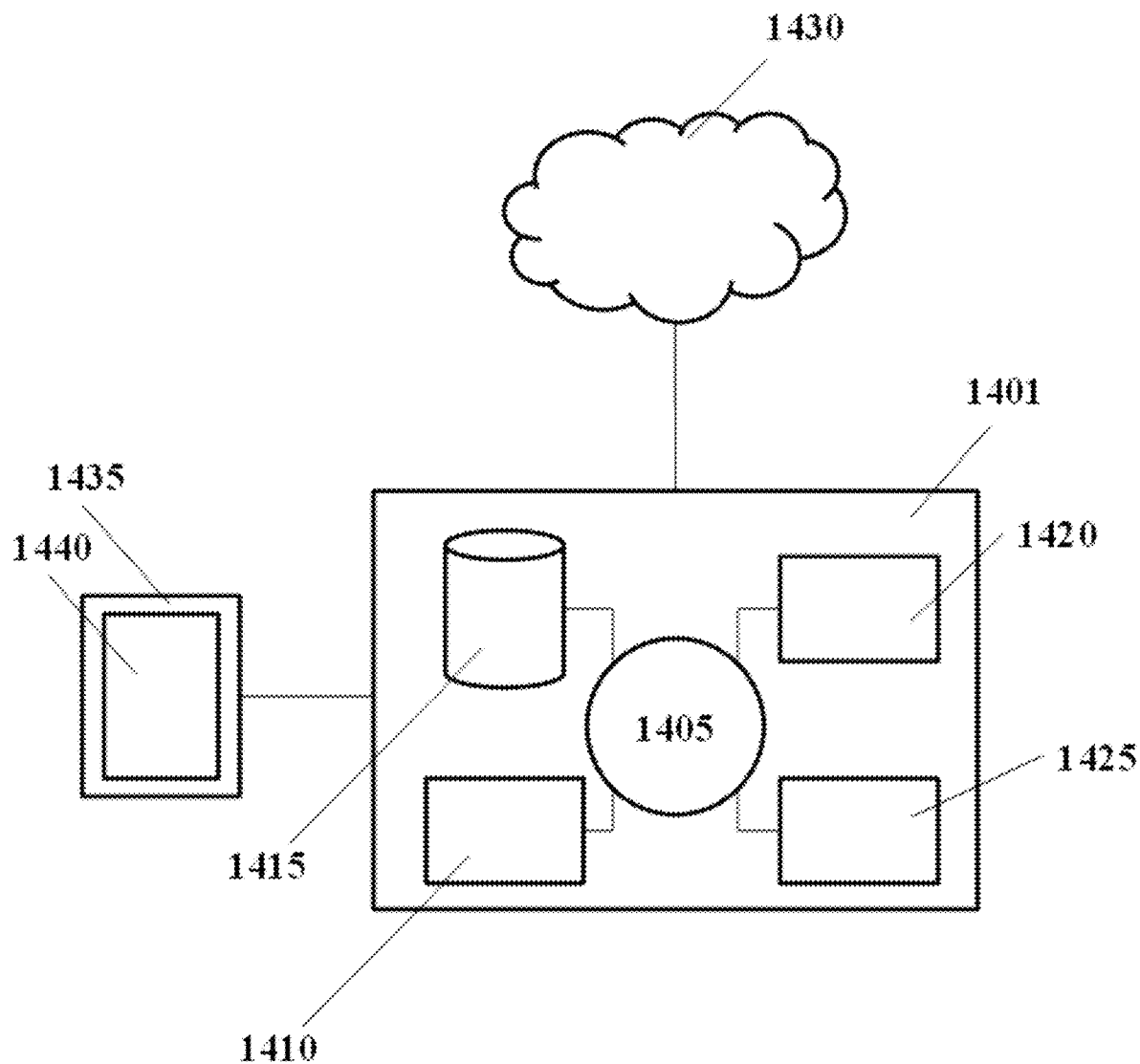
FIG. 14 shows a computer system that is programmed or otherwise configured to implement methods provided herein.

FIG. 14 shows a computer system 1401 that is programmed or otherwise configured to communicate with and regulate various aspects of operation or scanning of reconstructable visual codes. The computer system 1401 can communicate with the one or more articles (e.g., one or more devices comprising the reconstructable visual codes), or one or more visual scanning systems (e.g., sensors) that are configured to scan and analyze reconstructed visual codes. The computer system 1401 can be an electronic device of a user or a computer system that is remotely located with respect to the electronic device. The electronic device can be a mobile electronic device.

The computer system 1401 includes a central processing unit (CPU, also "processor" and "computer processor" herein) 1405, which can be a single core or multi core processor, or a plurality of processors for parallel processing. The computer system 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 can be a data storage unit (or data repository) for storing data. The computer system 1401 can be operatively coupled to a computer network ("network") 1430 with the aid of the communication interface 1420. The network 1430 can be the Internet, an internet and/or extranet, or an intranet and/or extranet that is in communication with the Internet. The network 1430 in some cases is a telecommunication and/or data network. The network 1430 can include one or more computer servers, which can enable distributed computing, such as cloud computing. The network 1430, in some cases with the aid of the computer system 1401, can implement a peer-to-peer network, which may enable devices coupled to the computer system 1401 to behave as a client or a server.

The CPU 1405 can execute a sequence of machine-readable instructions, which can be embodied in a program or software. The instructions may be stored in a memory location, such as the memory 1410. The instructions can be directed to the CPU 1405, which can subsequently program or otherwise configure the CPU 1405 to implement methods of the present disclosure. Examples of operations performed by the CPU 1405 can include fetch, decode, execute, and writeback.

The CPU 1405 can be part of a circuit, such as an integrated circuit. One or more other components of the system 1401 can be included in the circuit. In some cases, the circuit is an application specific integrated circuit (ASIC).

The storage unit 1415 can store files, such as drivers, libraries and saved programs. The storage unit 1415 can store user data, e.g., user preferences and user programs. The computer system 1401 in some cases can include one or more additional data storage units that are external to the computer system 1401, such as located on a remote server that is in communication with the computer system 1401 through an intranet or the Internet.

The computer system 1401 can communicate with one or more remote computer systems through the network 1430. For instance, the computer system 1401 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1401 via the network 1430.

Methods as described herein can be implemented by way of machine (e.g., computer processor) executable code stored on an electronic storage location of the computer system 1401, such as, for example, on the memory 1410 or electronic storage unit 1415. The machine executable or machine readable code can be provided in the form of software. During use, the code can be executed by the processor 1405. In some cases, the code can be retrieved from the storage unit 1415 and stored on the memory 1410 for ready access by the processor 1405. In some situations, the electronic storage unit 1415 can be precluded, and machine-executable instructions are stored on memory 1410.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1401 can include or be in communication with an electronic display 1435 that comprises a user interface (UI) 1440 for providing, for example, (i) activating one or more actuation elements to reconstruct the reconstructable visual codes to generate unique visual codes, (ii) controlling the visual scanning systems (e.g., a handheld QR reader, a personal device comprising one or more cameras, etc.) to capture and analyze images/videos of such unique visual codes of the reconstructable visual codes, and (iii) storing the images/videos and thei respective analysis over time. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1405. The algorithm can, for example, distinguish a reconstructed visual code from a non-reconstructed visual code.

While preferred embodiments of the present disclosure have been shown and provided herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for forming a functional visual code, comprising:
    a visual code that is segmented into a plurality of individual portions comprising (i) a physical individual portion provided on a physical object and (ii) a virtual individual portion provided in an augmented reality space, wherein the plurality of individual portions are configured to transform between two or more states,
        wherein, in a first state, the plurality of individual portions are spaced apart to form a non-functional visual code, and
        wherein, in a second state, the plurality of individual portions are moved relative to each other in the augmented reality space to reconstruct the functional visual code, wherein the reconstructed functional visual code represents digital information associated with the physical object, wherein the digital information is retrievable from a database; and
    a graphical user interface (GUI) application comprising the augmented reality space, wherein the GUI is programmed to verify the reconstructed functional visual code, to access the digital information from the database.

2. The system of claim 1, wherein, in the second state, the plurality of individual portions are (i) directly adjacent to each other, and/or (ii) overlapping over one another in the augmented reality space to reconstruct the functional visual code.

3. The system of claim 1, wherein the GUI is configured to verify the reconstructed functional visual code based, in part, on an image and/or a video of the reconstructed functional visual code.

4. The system of claim 3, wherein the GUI is further configured to distinguish the visual code between the first state and the visual code in the second state.

5. The system of claim 1, wherein the reconstruction of the visual code is for tracking of the physical object.

6. The system of claim 1, wherein the physical individual portion is provided by a pharmacy, and the virtual individual portion is provided by a user of a drug or the user's proxy.

7. The system of claim 6, wherein the physical individual portion is provided on a container or packaging configured to hold the drug that is assigned to the user.

8. The system of claim 6, wherein the drug is prescribed to the user.

9. The system of claim 1, wherein the GUI is associated with a user device.

10. The system of claim 9, wherein the user device comprises a scanner configured to scan the physical individual portion to reconstruct the functional visual code in the augmented reality environment.

11. The system of claim 10, wherein the scanner comprises a camera.

12. The system of claim 1, wherein the virtual individual portion is provided in the augmented reality environment that is associated with a pharmacy.

13. The system of claim 1, wherein the GUI is programmed to display the relative movement between the plurality of individual portions in the augmented reality space.

14. The system of claim 1, wherein, in the second state, the plurality of individual portions are moved relative to each other in the augmented reality space of a user device upon a relative movement between the physical object and the user device.

15. The system of claim 1, wherein the reconstruction of the visual code is for accountability of the physical object.

16. The system of claim 1, wherein the reconstruction of the visual code is for security of the physical object.

17. The system of claim 1, wherein the reconstruction of the visual code is for authentication of the physical object.

18. The system of claim 1, wherein the reconstruction of the visual code is for transaction of the physical object.

\* \* \* \* \*